(12) United States Patent
Pazos et al.

(10) Patent No.: US 10,187,220 B2
(45) Date of Patent: Jan. 22, 2019

(54) SIGNALING OF SERVICE DEFINITION FOR EMBMS SERVICES USING DIFFERENT BEARERS IN DIFFERENT AREAS

(71) Applicant: QUALCOMM Incorporated, San Diego, CA (US)

(72) Inventors: Carlos Marcelo Dias Pazos, Carlsbad, CA (US); Nagaraju Naik, San Diego, CA (US); Ralph Akram Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/675,964

(22) Filed: Apr. 1, 2015

(65) Prior Publication Data

US 2015/0304122 A1    Oct. 22, 2015

Related U.S. Application Data

(60) Provisional application No. 61/981,828, filed on Apr. 20, 2014.

(51) Int. Cl.
*H04L 12/28* (2006.01)
*H04L 12/18* (2006.01)
(Continued)

(52) U.S. Cl.
CPC ...... *H04L 12/1845* (2013.01); *H04L 61/2007* (2013.01); *H04L 61/2069* (2013.01); *H04W 4/06* (2013.01); *H04W 48/18* (2013.01)

(58) Field of Classification Search
CPC .... H04W 4/06; H04W 48/18; H04L 12/1845; H04L 29/12; H04L 12/28
See application file for complete search history.

(56) References Cited

U.S. PATENT DOCUMENTS 9,351,149 B2     5/2016   Wang et al.
2008/0287057 A1* 11/2008  Zisimopoulos ..... H04W 72/005
                                                            455/3.01
(Continued)

FOREIGN PATENT DOCUMENTS

JP    2010525692 A    7/2010
WO    2013148032 A1   10/2013

OTHER PUBLICATIONS

3rd Generation Partnership Project: Technical Specification Group Services and System Aspects; Multimedia Broadcast/Multicast Service (MBMS); Protocols and codecs, Release 12,3 GPP TS 26.346 V12.1.0, Mar. 2014, 181 pp.
(Continued)

*Primary Examiner* — Wei Zhao
(74) *Attorney, Agent, or Firm* — The Marbury Law Group, PLLC

(57) ABSTRACT

Systems, methods, and devices of the various embodiments enable a receiver device to determine the available broadcast services in a network having different network identifiers assigned to different geographic regions. The various embodiments enable a receiver device to identify a national service (e.g., a service available in more than one geographic region of the network) assigned different temporary mobile group identifiers ("TMGIs") in different geographic regions as the same service across the different geographic regions.

67 Claims, 17 Drawing Sheets

(51) Int. Cl.
   *H04W 4/06* (2009.01)
   *H04L 29/12* (2006.01)
   *H04W 48/18* (2009.01)

(56) References Cited

U.S. PATENT DOCUMENTS

| | | | |
|---|---|---|---|
| 2012/0236776 A1* | 9/2012 | Zhang | H04W 48/12 |
| | | | 370/312 |
| 2013/0170435 A1 | 7/2013 | Dinan | |
| 2013/0242738 A1 | 9/2013 | Chang | |
| 2013/0294318 A1* | 11/2013 | Amerga | H04W 4/06 |
| | | | 370/312 |
| 2014/0080475 A1 | 3/2014 | Gholmieh et al. | |

OTHER PUBLICATIONS

Partial International Search Report—PCT/US2015/024177—ISA/EPO—Jul. 7, 2015.
International Search Report and Written Opinion—PCT/US2015/024177—ISA/EPO—Sep. 25, 2015.
3rd Generation Partnership Project; Technical Specification Group Services and System Aspects; Multimedia Broadcast/Multicast Service (MBMS); Protocols and codecs, Release 12, 3GPP TS 26.346 V12.8.0, Dec. 2015, 210 Pages.
European Search Report—EP17201713—Search Authority—Munich—dated Feb. 2, 2018.

* cited by examiner

US 10,187,220 B2

SIGNALING OF SERVICE DEFINITION FOR EMBMS SERVICES USING DIFFERENT BEARERS IN DIFFERENT AREAS

CROSS REFERENCE TO RELATED APPLICATIONS

This application claims the benefit of priority to U.S. Provisional Patent Application No. 61/981,828 entitled "Signaling of Service Definition for eMBMS Services Using Different Bearers in Different Areas" filed Apr. 20, 2014, the entire contents of which are hereby incorporated by reference.

BACKGROUND

In current evolved Multimedia Broadcast Multicast Service ("eMBMS") networks established according to the 3rd Generation Partnership Projects ("3GPP") Technical Standards ("TSs") network broadcast services, (e.g., audio or video streaming), can be provided as broadcast services (e.g., Multimedia Broadcast Multicast Service ("MBMS") services). In some current eMBMS networks, network operators (e.g., core network operators) assign different network identifiers ("IDs"), such as different public land mobile network ("PLMN") IDs, to different geographic regions covered by the same network (e.g., the same core network). For example, one geographic region associated with a first city may be assigned a first PLMN ID and a second geographic region associated with a second city may be assigned a second PLMN ID, though both geographic regions may be part of the same core network. The use of different network identifiers, such as different PLMN IDs, in different geographic regions of the same network presents challenges in service delivery across the different geographic regions.

SUMMARY

The systems, methods, and devices of the various embodiments enable a receiver device to determine the available broadcast services in a network having different network identifiers assigned to different geographic regions. The various embodiments enable a receiver device to identify a national service (e.g., a service available in more than one geographic region of the network) assigned different temporary mobile group identifiers ("TMGIs") in different geographic regions as the same service across the different geographic regions.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
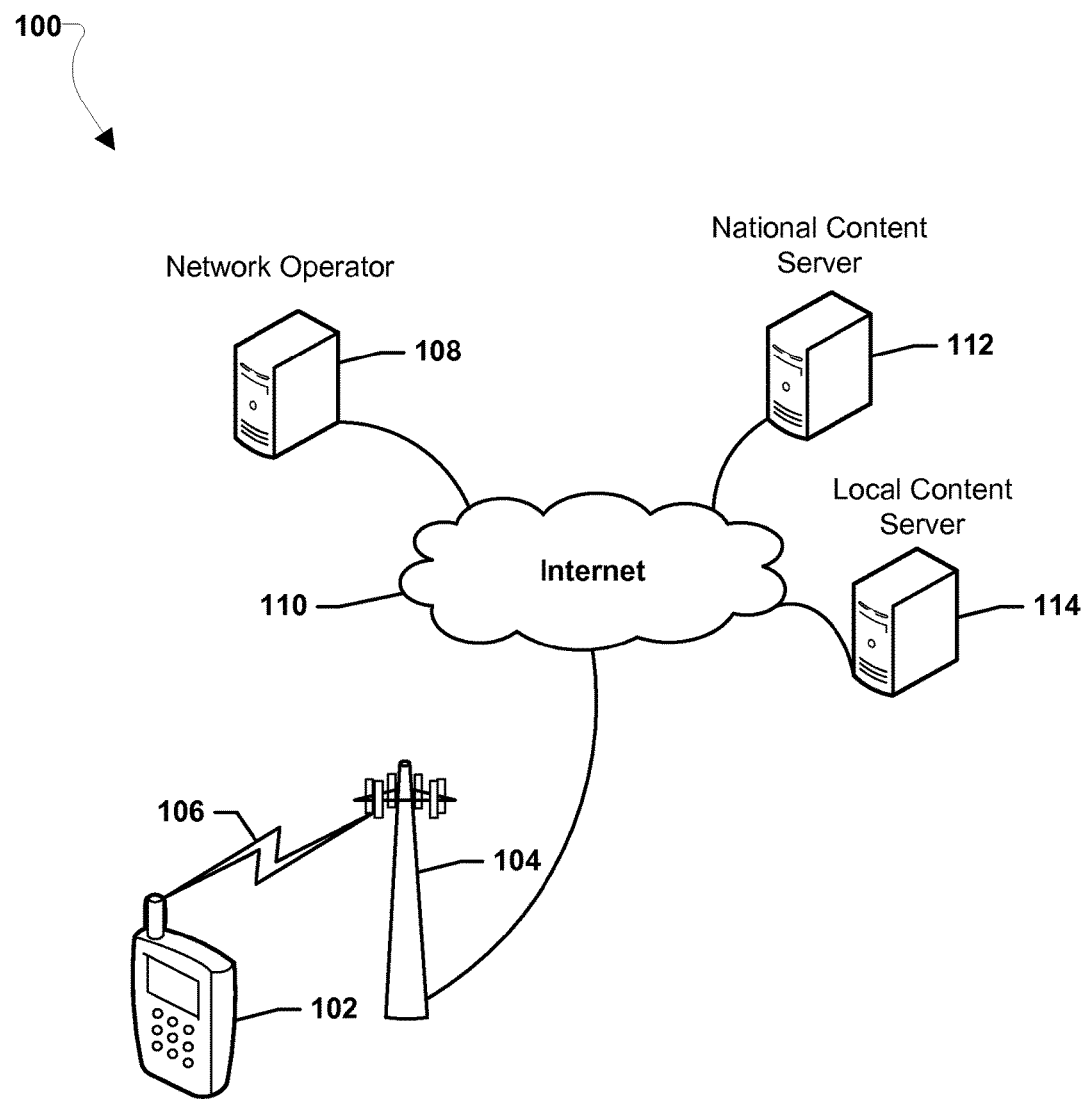
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "receiver device" is used to refer to any one or all of cellular telephones, smart phones, personal or mobile multi-media players, personal data assistants ("PDAs"), personal computers, laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for receiving broadcast services, such as Multimedia Broadcast Multicast Service ("MBMS") services.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server type functionality that can be implemented on a receiver device thereby enabling it to function as an Internet server (e.g., an enterprise e-mail server) only to the extent necessary to provide the functionality described herein.

In evolved Multimedia Broadcast Multicast Service ("eMBMS") networks, network operators (e.g., core network operators) may assign different network identifiers ("IDs"), such as different public land mobile network ("PLMN") IDs, to different geographic regions covered by the same network (e.g., the same core network). For example, one geographic region associated with a first city may be assigned a first PLMN ID and a second geographic region associated with a second city may be assigned a second PLMN ID, though both geographic regions may be part of the same core network for the distribution of eMBMS services.

The use of different network identifiers, such as different PLMN IDs, in different geographic regions of the same network may cause a service available in different geographic regions of the network to be assigned a different temporary mobile group identifier ("TMGI") in each geographic region, even though the service may be the same service in each geographic region. For example, TMGI's may be generated for a broadcast service by combining a service ID for the service, such as an MBMS service ID, with a PLMN ID. When PLMN IDs are different across different geographic regions of the same network, multiple different TMGI's may be generated all carrying the content for the same service in the different geographic regions. Some networks may not provide a receiver device prior indications of different TMGIs assigned to the same service in different geographic regions of the network. Without a prior indication that the same service is assigned different TMGIs in different geographic regions of the network (e.g., one TMGI in a first geographic region of the network and another TMGI in a second geographic region of the network), when a receiver device consuming the same service in the first geographic region travels into the second geographic region the same service may be interrupted because the TMGI for the first geographic region may no longer be available. The new TMGI for the same service in the second geographic region may need to be discovered and the same service newly activated based on the new TMGI used in the second geographic region. As a result of needing to discover the new TMGI used in the second geographic region, the user experience of the service may be impacted even though the service was available (i.e., broadcast) in both geographic regions.

The systems, methods, and devices of the various embodiments include methods for configuring broadcasts of services that enable a suitably configured receiver device to determine the available broadcast services in a network having different network identifiers (e.g., different PLMN IDs) assigned to different geographic regions. The various embodiments include methods for configuring broadcasts of services that enable a suitably configured receiver device to identify a particular national service (e.g., a service available in more than one geographic region of the network) that is assigned different TMGIs in different geographic regions as the same service across the different geographic regions.

In an embodiment, a user service description ("USD"), i.e., service discovery information, may be generated for each geographic region of the network having a different PLMN ID and each USD may indicate the TMGIs of services available in that respective geographic region. A national service available in more than one geographic region of the network may be defined as two separate services with different session description protocols ("SDPs") established according to the Session Description Protocol as described in IETF RFC 4566 for the national service defined in each different geographic region's USD. Each geographic region's USD may define the SDP with the TMGI assigned for the national service in that respective geographic region. In addition to indicating the TMGI of each service, the SDPs of the services may indicate the transport session identifier ("TSI") and the source IP address for the File Delivery Over Unidirectional Transport ("FLUTE") (as described in Internet Engineering Task Force ("IETF") Request For Comments ("RFC") 6726) session associated with that service. The generation of USDs on a per geographic region basis may enable USDs to be relatively smaller files because only information about services available in the geographic regions associated with the USD may be indicated. In an embodiment, based on the geographic region specific USDs, a service announcement ("SA") file (e.g., a set of USD fragments describing available services) for each geographic region including the SDPs of the services available in that geographic region may be generated and made available over a SA channel or bearer in that geographic region.

In an embodiment, an application or client running on a processor of the receiver device, such as an application or client that consumes services (e.g., a Dynamic Adaptive Streaming over HTTP ("DASH") client), an MBMS client controlling various hardware of the receiver device (e.g., one or more modems) to establish one or more unicast and/or broadcast connections and provide content to another application or client that consumes services, and/or an application running on a modem processor (e.g., a connection agent), may determine that a same service, such as a national service, is available in two different geographic regions of the network under two different TMGIs by identifying a same name of the service indicated in the two different USDs for the two different geographic regions. In an embodiment, upon, or in anticipation of, travel into a new geographic region of the network, bootstrapping operations to identify the SA bearer or channel carrying the USD (or USD fragment, such as a SA file) for the new region may be performed by the receiver device, and the USD for the new geographic region may be acquired via the bearer by the receiver device. An application or client running on a processor of the receiver device may identify the TMGI's available in the new geographic region from the acquired USD and determine any correspondence between services in a previous geographic region of the network and the new geographic region by identifying matching names of the services indicated in the USD. When a national service is being consumed by the receiver device in a first geographic region and the receiver device travels to a second geographic region, the TMGI for the national service in the second geographic region may be identified and the FLUTE session corresponding to the national service's TSI and source IP address in the second geographic region may be activated to receive the national service in the second geographic region.

In an embodiment, the application or client running on a processor of the receiver device may maintain a combined list of services generated as USDs for different geographic regions are acquired. The combined list of services may include an indication that different TMGIs, as well as other information such as TSIs and source IP addresses, correspond to the same national service in different geographic regions. In this manner, as geographic regions are revisited, national services may be activated without having to complete bootstrapping operations and re-download of the USD because the information needed to activate the service may already be available to the receiver device. In an embodiment, different file names and hashes (e.g., an MD5 Hash) may be assigned to the different USDs (or USD fragments, such as a SA files) available in each geographic region. The different file names may prevent situations in which a new USD may not be fully downloaded in one area because the receiver devices assumes that a new version (a different MD5) of the file is being advertised in a new area because the new USD and a previous USD share the same file name. Additionally, the different hashes (MD5) may lead to aborting the downloading of a previously incompletely downloaded USD due to the receiver device assuming a new version of the same file is being received when a new USD is received in a new geographic region. In this manner, problems that would otherwise occur in the reception of services while in transition between geographic regions, especially in rapid successive transitions between geographic regions (e.g., "ping ponging" between geographic regions), may be prevented.

In various embodiments, a USD may be generated describing services across more than one geographic region of a network having different PLMN IDs. In an embodiment, a global USD may be generated listing all services across all geographic regions of the network regardless of the PLMN IDs. In an embodiment, multiple versions of the national services may be described each having its own SDP in the global USD. Additionally, all local services may be described by their own SDPs in the global USD, even though only those local services available in the current geographic region of the receiver device may be of interest. In an embodiment, the receiver device may identify the current geographic region and using the SAI in the SIB15 message or the available TMGI for the current geographic region may determine the version of the national services and the local services available in the current geographic region using the global USD. The global USD listing all services across all geographic regions each with its own SDP may be a large file and zipping (e.g., compressing) the file, for example with GZIP, may reduce the size of the file for transmission to receiver devices.

In another embodiment, a global USD may describe national services available in the network only once with a single SDP listing for each national service describing all the TMGIs for the national service used in the different geographic regions of the network. Additionally, the same FLUTE session TSI and the same source IP address may be used in all geographic regions, and the SDP may list only one TSI for the national service. So, upon activating the national service, only one FLUTE session is joined. The receiver device may also activate all TMGIs of the national service when entering a new geographic region, and because only one TMGI will be available for the national service in the new geographic region the receiver device may only succeed in joining the one TMGI of the new geographic region. After one TMGI is successfully joined the one or more unsuccessful TMGIs may be deactivated. Alternatively, the receiver device may determine the PLMN ID of the new geographic region and may select only the TMGI including that PLMN ID for activation to receive packets for the one FLUTE session joined to provide the national service. In an embodiment, the different TMGIs used by the service may be listed in the same type attributes in the single SDP, for example "mbms-mode" attributes for each respective TMGI may be indicated in the single SDP. In another embodiment, TMGIs may be listed in different type attributes in the single SDP. For example, one TMGI may be indicated in an "mbms-mode" attribute, while any alternative TMGIs may be indicated in one or more "altTMGI" attributes.

In another embodiment, a global USD may describe national services available in the network once and the same FLUTE session TSI and source IP address may be used in all geographic regions. Different SDPs for each geographic region listing only the TMGI of the national service in that geographic region may be included in the global USD under a single instance of the national service. As an example, a global USD may include one or more delivery method type attributes and one expanded delivery method type describing the single service. The multiple occurrences of the delivery method may identify a specific SDP via the sessiondescriptionURI attribute. Based on the global USD, a receiver device may determine that the different SDPs actually describe the same single FLUTE session used in all geographic regions.

In an embodiment, network servers, such as broadcast multicast service center ("BM-SC") servers, for each geographic region of the network may be in communication with an optional provisioning interface server. In an embodiment, the provisioning interface server may gather information about the national and local services available in each geographic region of the network and may generate service announcement documents for provisioning to receiver devices to enable the receiver devices to receive services in the network. In another embodiment, the provisioning server may define all of the service information for national and local services and communicate all the defined services to the different BM-SCs as service announcement information for distribution to receiver devices. In a further embodiment, the provisioning server may collect the TMGI to be used in each BM-SC and generate the remaining service announcement information.

Service announcement documents may include various files enabling the receiver devices to receive services, such as USD Bundles (USDBs), USDBs fragments, SDP fragments, etc. For example, each BM-SC may generate a service announcement file indicating the national service definitions and the local service definitions for its geographic region and send them to the receiver devices located in the area that the BM-SC serves. In an embodiment, a USDB may be generated by a BM-SC and sent to the receiver devices located in the area that the BM-SC serves indicating the national service definitions and the local service definitions for its geographic region.

In an embodiment, the provisioning interface server may use the service announcement files from the BM-SCs of the network to generate a global USD which may be provided back to each BM-SC for provisioning to receiver devices when receiver devices are located in the geographic region served by a respective BM-SC. In an alternative embodiment, the provisioning interface server may use the service announcement files from the BM-SCs to generate a geographic region specific USD for each geographic region's BM-SC that describes all the national services available in the network and only those local services available in that respective geographic region. As an example, the geographic region specific USD may describe national services available in the network each with its own SDP and only the local services available in that geographic region. As another example, the geographic region specific USD may describe national services available in the network with the TMGIs used for the national services described in only one SDP associated with only one instance of each national service and only the local services available in that geographic region. As a further example, the geographic region specific USD may describe national services available in the network with only one instance of each national service and SDPs for each geographic region or each national service separately described in an SDP per TMGI and only the local services available in that geographic region.

In an embodiment in which a national service may be a DASH service, a media presentation description ("MPD") may be shared by the different versions of the service available in different geographic regions of the network. In another embodiment in which a national service may be a DASH service, each version of the service in each geographic region may have its own MPD.

In various embodiments, when bootstrapping operations may be avoided in whole or in part at geographic region transition, latency associated with determining location based services may be reduced.

FIG. 1 illustrates a cellular network system 100 suitable for use with the various embodiments. The cellular network system 100 may include multiple devices, such as a receiver device 102, one or more cellular towers or base stations 104, and servers 108, 112, and 114 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the receiver device 102 and the server(s) 108, 112, and 114. In an embodiment, server 108 may be a network operator server controlling the operations of the cellular network including the receiver device 102 and the cellular tower or base station 104, and controlling the over the air ("OTA") transmission of content to the receiver device 102. For example, the network operator server 108 may control server 112 and/or 114 to provide one or more services to the receiver device 102 via unicast and/or broadcast OTA transmissions. While features of embodiment receiver devices and networks may be described with reference to OTA transmissions, these features may be used in connection with wired transmissions, wireless transmissions, or a combination of wired and wireless transmissions. Thus, OTA transmission is not required. In an embodiment, server 112 may be a national content server providing national services (e.g., nationally broadcast content available in more than one geographic region of the cellular network system 100) and server 114 may be a local content server providing local services (e.g., local broadcast content available in only one geographic region of the cellular network system 100, such as only one geographic region).

Figure 2:
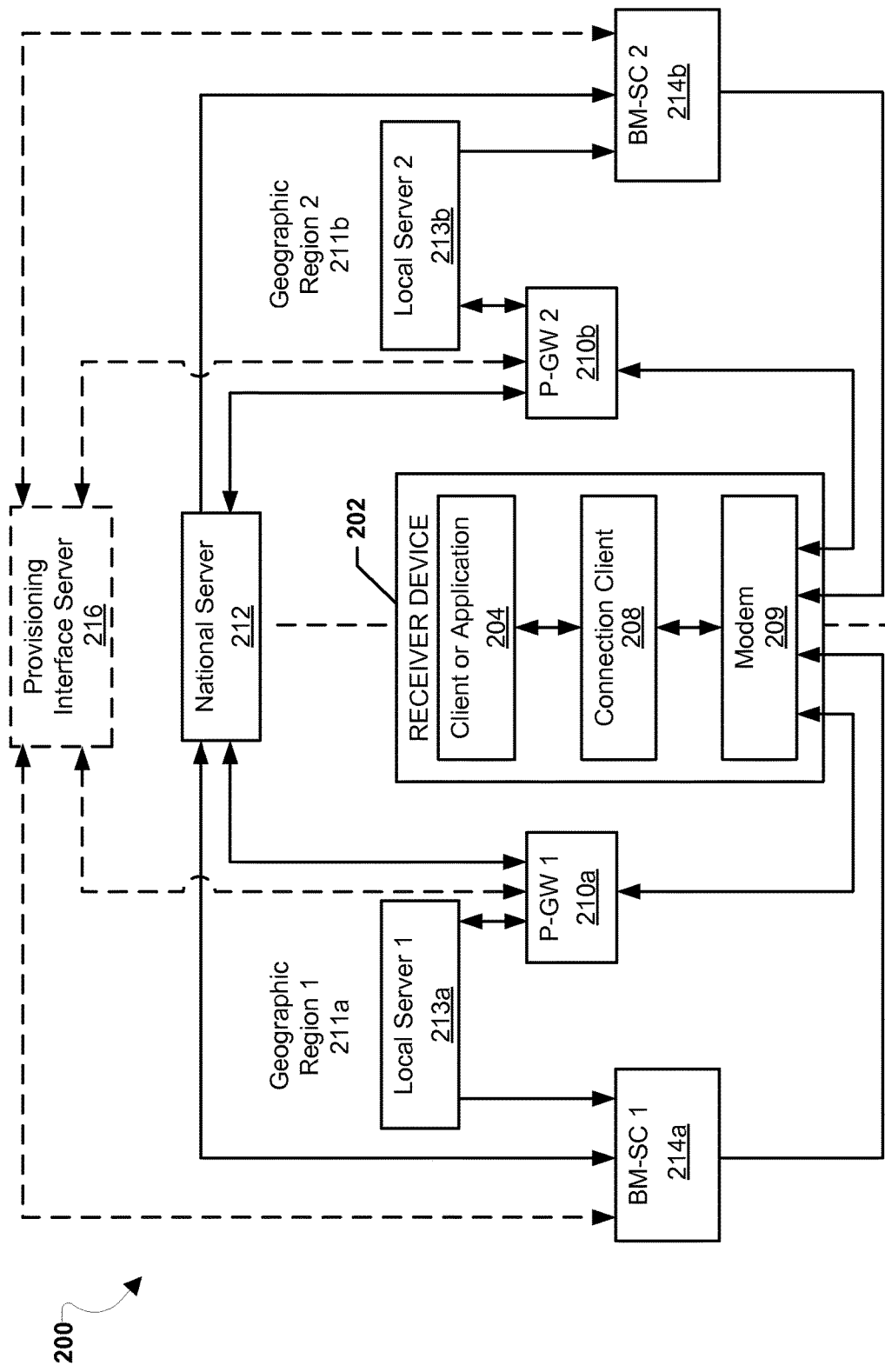
FIG. 2 is a block diagram illustrating a receiver device and network architecture according to an embodiment.

FIG. 2 illustrates a system architecture of a receiver device 202 in communication with a network 200 according to an embodiment. The network may be a wireless network (e.g., an LTE network) having at least two different geographic regions, Geographic Region 1 211a and Geographic Region 2 211b, that may be assigned different network identifiers, for example different PLMN IDs. The network 200 may provide both national and local services to the receiver device 202. The national services may be available in both Geographic Region 1 211a and Geographic Region 2 211b and may be provided from a national server 212. The local services may be available in only their respective assigned geographic region, with local services unique to Geographic Region 1 211a provided from local server 1 213a and local services unique to Geographic Region 2 211b provided from local server 2 213b.

The receiver device 202 may travel between Geographic Region 1 211a and Geographic Region 2 211b. When the receiver device 202 is located in Geographic Region 1 211a, the network 200 may provide unicast services to the receiver device 202 via a first packet data network ("PDN") gateway ("P-GW") 1 210a and broadcast services to the receiver device 202 via a first BM-SC 1 214a. The P-GW 1 210a may send and/or receive data with the local server 1 213a and the national server 212, and the BM-SC 1 214a may receive data from the local server 1 213a and the national server 212. As an example, the local server 1 213a may be an HTTP server hosting resources, such as DASH media segments, for a local service and the national server 212 may be an HTTP server hosting resources, such as DASH media segments, for a national service. Via the P-GW 1 210a and/or BM-SC 1 214a both the national service from the national server 212 and the local service from the local server 1 213a may be made available via unicast and/or have their content sent to the respective BM-SCs for broadcast transport to the receiver device 202 when the receiver device 202 is in Geographic Region 1 211a.

Similarly, when the receiver device 202 is located in Geographic Region 2 211b, the network 200 may provide unicast services to the receiver device 202 via P-GW 2 210b and have their content sent to the respective BM-SCs for broadcast transport to the receiver device 202 via BM-SC 2 214b. The P-GW 2 210b may be send and/or receive data with the local server 2 213b and the national server 212, and the BM-SC 2 214b may receive data from the local server 2 213b and the national server 212. As an example, the local server 2 213b may be an HTTP server hosting resources, such as DASH media segments, for a local service and the national server 212 may be an HTTP server hosting resources, such as DASH media segments, for a national service. Via the P-GW 2 210b and/or BM-SC 2 214b both the national service from the national server 212 and the local service from the local server 2 213b may be made available via unicast and/or broadcast transport to the receiver device 202 when the receiver device 202 is in Geographic Region 2 211b.

As illustrated by the above examples, the national server 212 may be providing the same national service to the receiver device in both Geographic Region 1 211a and Geographic Region 2 211b.

The receiver device 202 may include a client or application 204, such as a DASH client or other type application, running on a processor of the receiver device 202. The client or application 204 may output services received by the receiver device 202 to a user of the receiver device 202. For example, the client or application 204 may be a television application outputting both national news services and local news services. The national news services may be provided from the national server 212 and the local news services unique to Geographic Region 1 211a and Geographic Region 2 211b, respectively, may be output by the local server 1 213a and local server 2 213b in each respective geographic region. The receiver device 202 may also include a connection client 208, such as a MBMS client, running on the processor of the receiver device 202. The connection client 208 may set up and control various hardware of the receiver device 202, such as one or more modems 209, to establish one or more unicast connections with the P-GW 1 210a and/or P-GW 2 210b and/or one or more broadcast connections with the BM-SC 1 214a and/or BM-SC 2 214b to send and/or receive data via unicast and/or broadcast transmissions, respectively. For example, the connection client 208 may control the various hardware of the receiver device 202 to activate FLUTE sessions/TMGIs that are appropriate for the geographic region the receiver device 202 may currently be located in. The connection client 208 may hide multiple services from the client or application 204. Additionally, the modem 209 may operate without control from the connection client 208 to establish one or more unicast connections with the P-GW 1 210a and/or P-GW 2 210b and/or one or more broadcast connections with the BM-SC 1 214a and/or BM-SC 2 214b to send and/or receive data via unicast and/or broadcast transmissions, respectively, on its own.

In an embodiment, the BM-SC 1 214a, the BM-SC 2 214b, the P-GW 1 210a, and/or the P-GW 2 210b may be in communication with an optional provisioning interface server 216. In an embodiment, the provisioning interface server 216 may gather information and/or generate information about the national and local services available in each geographic region of the network 200 and may generate service announcement documents for provisioning to the receiver device 202 to enable the receiver device 202 to receive services in the network 200. For example, the provisioning interface server 216 may enable all services available on the network 200, national and local, to be defined, and may distribute appropriate service announcement information to respective BM-SCs. Service announcement documents may include various files enabling the receiver device 202 receive services, such as USDs, USD fragments (e.g., SA files), etc. For example, the BM-SC 1 214a may generate a service announcement file indicating the national service definitions and the local service definitions for Geographic Region 1 211a and send the service announcement file to the provisioning interface server 216. BM-SC 2 214b may also generate a service announcement file indicating the national service definitions and the local service definitions for Geographic Region 2 211b and the service announcement file to the provisioning interface server 216.

In an embodiment, the provisioning interface server 216 may use the service announcement files from the BM-SC 1 214a and BM-SC 2 214b to generate a global USD which may be provided back to BM-SC 1 214a and BM-SC 2 214b for provisioning to receiver device 202 when receiver device 202 is in Geographic Region 1 211a or Geographic Region 2 211b, respectively. As examples, a global USD may describe all services available in the network each with its own SDP, a global USD may describe all services available in the network with the TMGIs used for national services described in only one SDP associated with only one instance of each national service, or a global USD may describe all services available in the network with only one instance of each national service and SDPs for each geographic region for each national service separately described in an SDP per TMGI. In an alternative embodiment, the provisioning interface server 216 may use the service announcement files from the BM-SC 1 214a and BM-SC 2 214b to generate a geographic region specific USD for each of BM-SC 1 214a and BM-SC 2 214b that describes all the national services available in the network and only those local services available in that respective geographic region. As examples, the geographic region specific USD may describe national services available in the network each with its own SDP and only the local services available in that geographic region, the geographic region specific USD may describe national services available in the network with the TMGIs used for the national services described in only one SDP associated with only one instance of each national service and only the local services available in that geographic region, or the geographic region specific USD may describe national services available in the network with only one instance of each national service and SDPs for each geographic region or each national service separately described in an SDP per TMGI and only the local services available in that geographic region.

Figure 3:
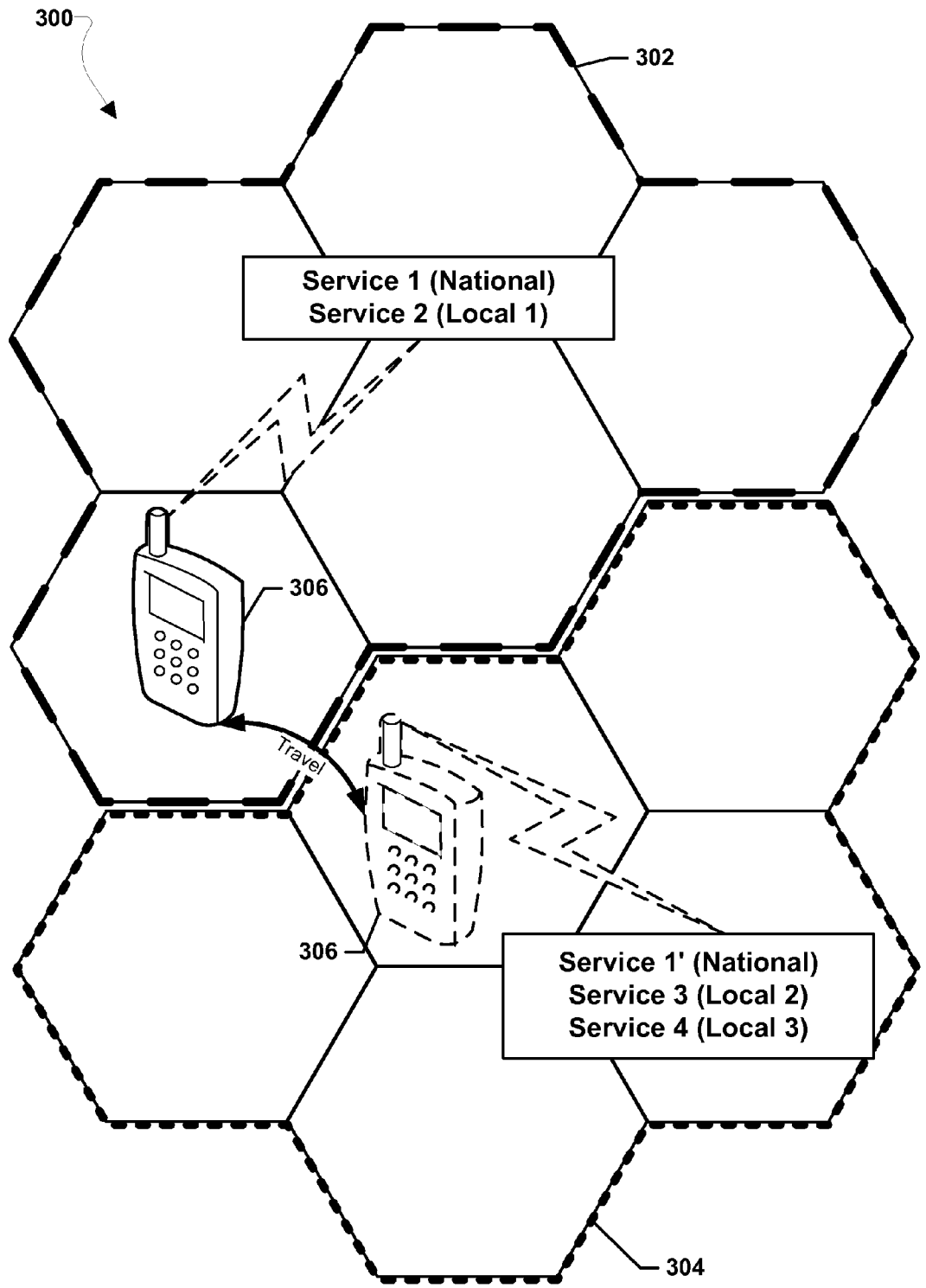
FIG. 3 is a block diagram illustrating an embodiment broadcast system suitable for use with the various embodiments.

FIG. 3 illustrates the potential relationship between a receiver device 306 and geographic regions 302 and 304 of a network 300. The network 300 may be comprised of different geographic regions 302 and 304 each associated with its own respective network identifier, such as a unique PLMN ID assigned to each geographic region 302 and 304. Geographic region 302 may comprise one or more cells, and geographic region 304 may comprise one or more different cells. Service 1 and service 2 may be broadcast services available in geographic region 302 and when receiver device 306 travels into geographic region 302 the receiver device 306 may receive both service 1 and service 2. Service 1 may be a national service identified as "National" and service 2 may be a local service identified as "Local 1." Service 1', service 3, and service 4 may be broadcast services available in geographic region 304 and when receiver device 306 travels into geographic region 304 the receiver device 306 may receive service 1', service 3, and service 4. Service 1' may be the same nation service identified as "National" that was available as service 1 in geographic region 302, while service 3 and service 4 may be unique services to geographic region 304, respectively identified as "Local 2" and "Local 3." As the network identifier (e.g., the PLMN ID) for geographic region 302 and geographic region 304 may be different, the TMGI for service 1 and service 1' may be different even though the service is the same national service identified by the same service name "National." In an embodiment, service 1 and service 1' may be assigned different FLUTE session TSIs. In another embodiment, service 1 and service 1' may be assigned the same FLUTE session TSIs.

Figure 4:
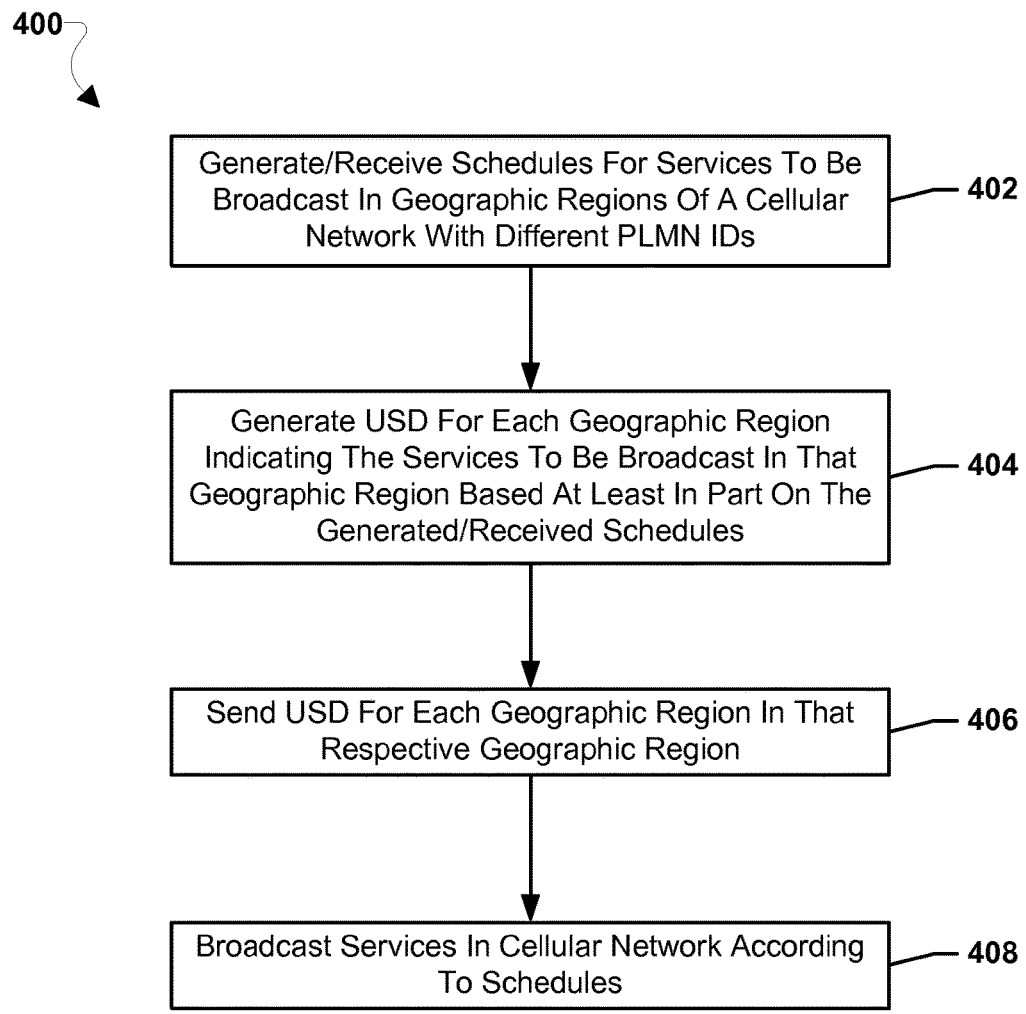
FIG. 4 is a process flow diagram illustrating an embodiment method for generating user service descriptions ("USDs") specific to each geographic region in a network.

FIG. 4 illustrates an embodiment method 400 for generating USDs specific to each geographic region with a different network identifier, such as a different PLMN ID, in a cellular network. In an embodiment, the operations of method 400 may be performed by a server of a network operator, such as an eMBMS network server (e.g., a provisioning interface server).

In block 402 the server may generate or receive schedules for services to be broadcast in geographic regions of a cellular network with different PLMN IDs. In an embodiment, the generated/received schedule may be a broadcast schedule used to control when services will be broadcast over a cellular network, such as an eMBMS network, for receipt by receiver devices. Services may be national services available in more than one geographic region of the cellular network or may be local services available in only one geographic region of the cellular network. In an embodiment, each service may be assigned its own TMGI in each geographic region. In an embodiment, each national service may be assigned a different TSI and different source IP address in each geographic region. In another embodiment, each national service may be assigned the same TSI and same source IP address in each geographic region.

In block 404 the server may generate a USD for each geographic region indicating the services to be broadcast in that geographic region based at least in part on the generated/received schedules. The USDs generated may be any type files, such as a SA files, schedule fragments, USD fragments, etc. In an embodiment, USDs may be generated on a per geographic region basis. As an example, each USD may indicate the services and their assigned names throughout the network that are to be broadcast in a specific geographic region, as well as the SDPs of those services indicating the TMGI for the service in the geographic region and TSI for the service in the geographic region. As another example, each USD may indicate the national services and their assigned names throughout the network with one SDP per national service indicating all the TMGI's for that national service and the TSI for that national service, as well as local services broadcast in a specific geographic region. As a further example, each USD may indicate the national services and their assigned names throughout the network with multiple SDPs per national service indicating the different TMGIs for the national service with the same TSI for the national service, as well as local services broadcast in a specific geographic region. As an additional example, each USD may indicate all the national services and their different TMGIs and different TSIs in separate SDPs, as well as local services broadcast in a specific geographic region.

In block 406 the server may send the USD for each geographic region in that respective geographic region. As an example, the server may send the USD via a broadcast channel dedicated to scheduling information, such as a SA channel or bearer. As another example, the USD may be sent via a unicast channel directly to a receiver device.

In block 408 the server may broadcast the services in the cellular network according to the generated schedules. As an example, a national service may be broadcast simultaneously in FLUTE sessions in each geographic region according to the schedule while a local service may be only broadcast in a FLUTE session in one geographic region of the network. In this manner, a receiver device located in any geographic region of the network may join the respective FLUTE session for its current geographic region to receive the national service throughout the network, while only receiver devices located in the geographic region of the local service may receive the local service by joining its FLUTE session.

Figure 5:
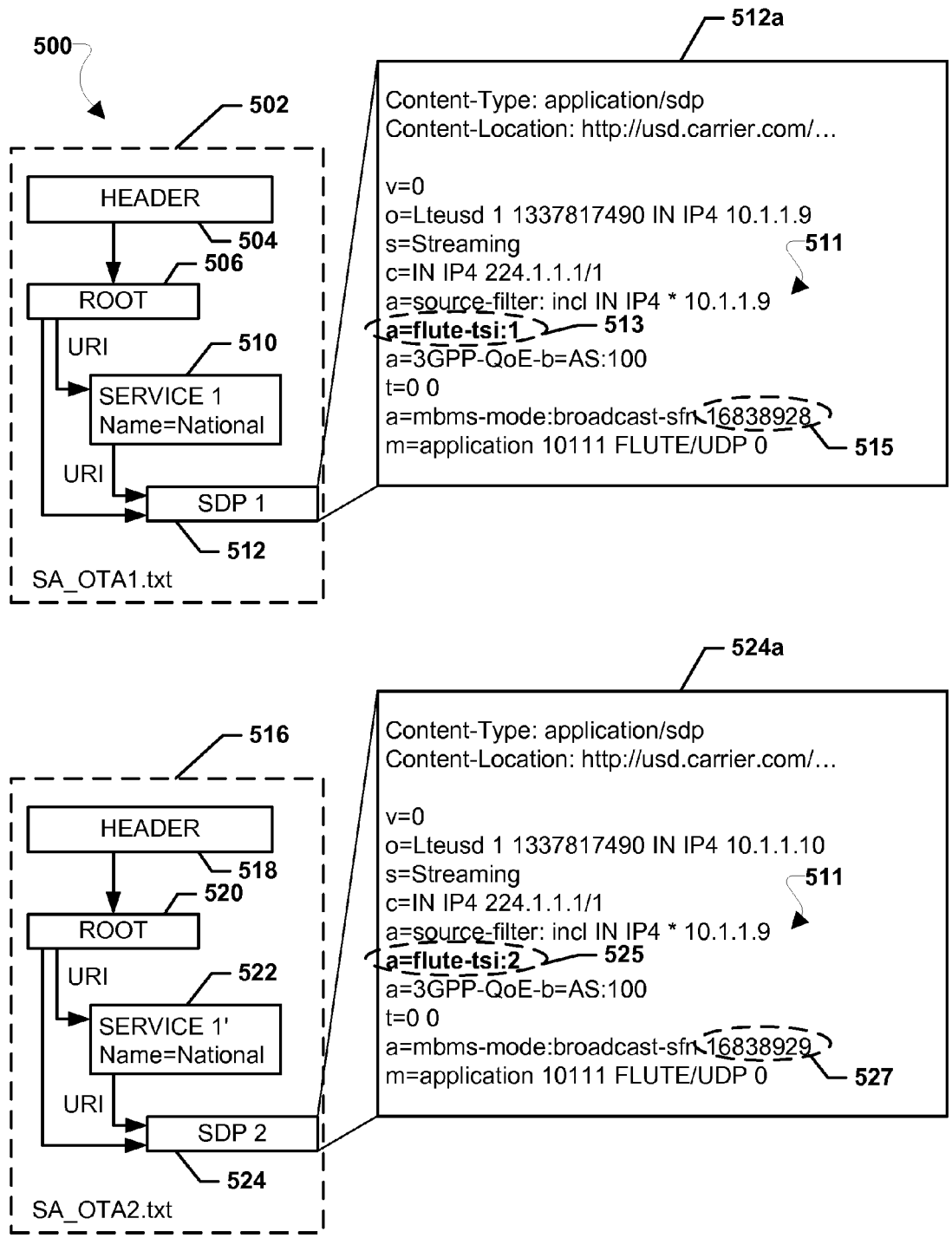
FIG. 5 is a data structure diagram of a service announcement ("SA") information file comprising USDs specific to geographic regions of a network according to an embodiment.

FIG. 5 is a data structure diagram of SA information file 500 comprising USD 502 and USD 516 each generated for different geographic regions of a network according to an embodiment. SA information file 500 may include files of different types, such as USDs, schedule fragments, SDP fragments, MPDs, etc. USDs may be any type files, such as a SA files, schedule fragments, USDBs, USD fragments, etc. For example, USD 502 and USD 516 may each be files with different file names "SA_OTA1.txt" and "SA_OTA2.txt", respectively. USD 502 and USD 516 may be different files each associated with different geographic regions of the network describing how the same national service named "National" may be broadcast in the different geographic regions. The USDs 502 and 516 may be different because the set of services described in each may be different and, as a result, the set of metadata fragments in each USD 502 and 516 may be different. The USD 502 may be associated with a first geographic region of the network and may include a header 504 and a root path 506. The USD 502 may indicate one or more services, such as Service 1 510 that may be the national service named "National", available in the first geographic region. The Service 1 510 may be associated with a SDP 1 512 that may indicate the TMGI and TSI assigned to the national service named "National" in the first geographic region. The USD 516 may be associated with a second geographic region of the network and may include a header 518 and a root path 520. The USD 516 may indicate one or more services, such as Service 1' 522 that may be the national service named "National" (corresponding to the Service 1 510 associated with the first geographic region), available in the second geographic region. The Service 1' 522 may be associated with a SDP 2 524 that may indicate the TMGI and TSI assigned to the national service named "National" in the second geographic region. In an embodiment, the USDs 502 and 516 may indicate the services and/or associated session descriptions by addresses (e.g., Uniform Resource Identifiers ("URIs") or Uniform Resource Locators ("URLs")) which identify the fragments that collectively describe a service. The SA information file 500 may be a group of files (e.g., metadata fragments) that collectively describe the services available. The USDs 502 and 516 (e.g., USDBs) may be the root elements describing a service and include URLs to identify the other metadata fragments describing the service.

FIG. 5 further illustrates an example schema 512a associated with SDP 1 512 and an example schema 524a associated with SDP 2 524. As illustrated in FIG. 5, the TSI 513 assigned to the national service named "National" in the first geographic region and the TSI 525 assigned to the national service named "National" in the second geographic region may be different even though the service may the same service being broadcast in both geographic regions. A FLUTE session may be defined by the TSI and source IP address. The source IP address may be defined by the a=source-filter attribute 511 in the SDP. Because the source IP address may be the same in both SDP 1 512 and SDP 2 524, the different TSIs 513 and 525 may identify the different FLUTE sessions of the service. Additionally, the TMGI 515 assigned to the national service named "National" in the first geographic region and the TMGI 527 assigned to the national service named "National" in the second geographic region may be different even though the service may be the same service being broadcast in both geographic regions.

Figure 6:
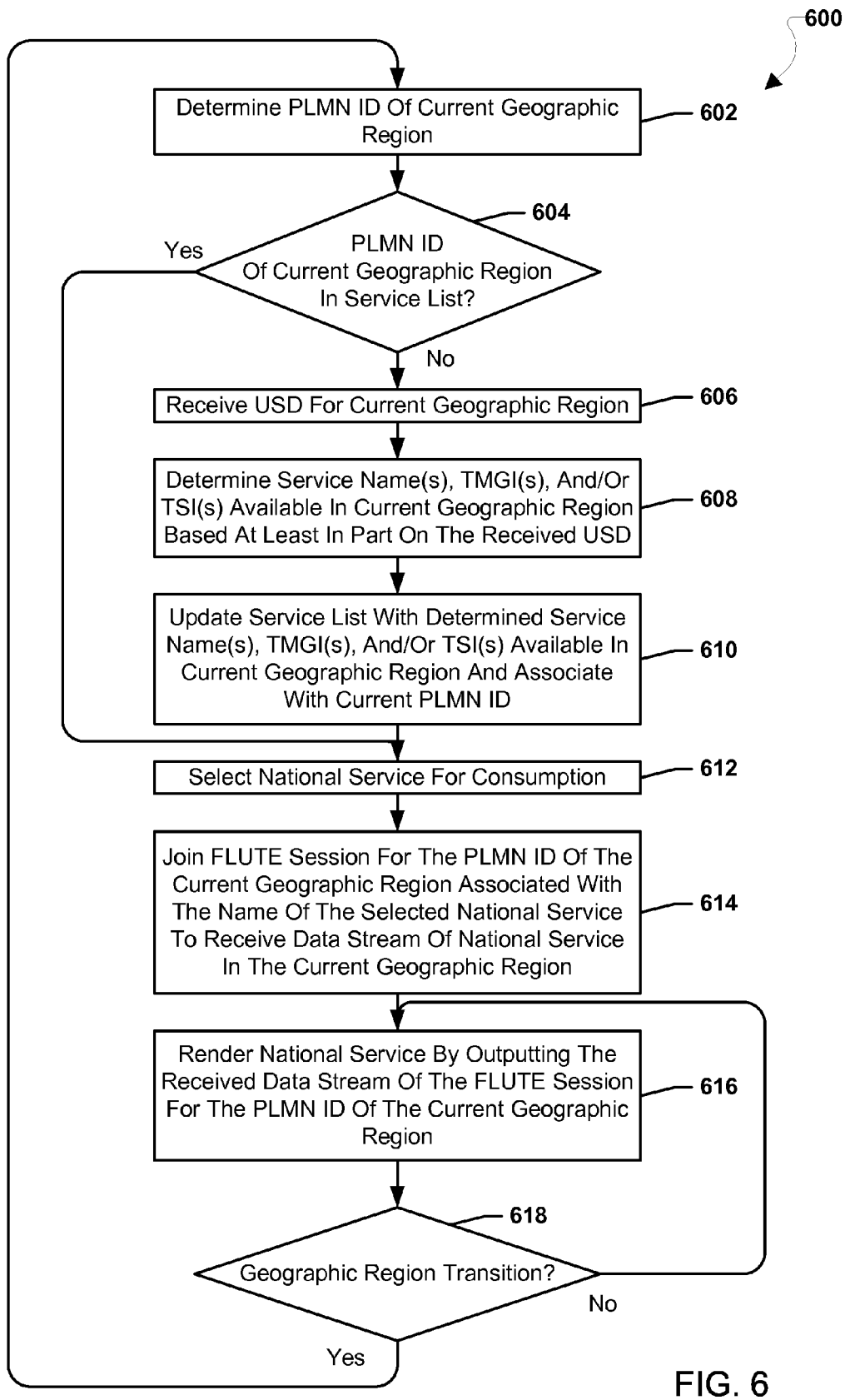
FIG. 6 is a process flow diagram illustrating an embodiment method for joining a FLUTE session to receive and render a national service available in two or more geographic regions of a network.

FIG. 6 is a process flow diagram illustrating an embodiment method 600 for joining a FLUTE session to receive and render a national service available in two or more geographic regions of a network. In an embodiment, the operations of method 600 may be performed by a client or application running on a processor of a receiver device, for example by a MBMS or DASH client.

In block 602 the processor may determine the PLMN ID of the current geographic region the receiver device may be located in. For example, the processor may determine the PLMN ID based on overhead signaling received by the receiver device. In block 604 the processor may determine whether the PLMN ID of the current geographic region is on a service list. A service list may be a list of PLMN IDs and information associated with the services available in each geographic region represented by those PLMN IDs, such as service names, service TMGIs, service TSIs, etc., stored in a memory of the receiver device. In an embodiment, a service list may be updated by the processor with PLMN IDs and information associated with the services available in each geographic region represented by those PLMN IDs as different geographic regions of the network are entered by the receiver device.

In response to determining the PLMN ID of the current geographic region is not on the service list (i.e., determination block 604="No"), the processor may receive the USD for the current geographic region in block 606. A USD may be any type of file, such as an SA file, schedule fragments, USD fragments, etc. In an embodiment, the processor may execute bootstrapping operations to identify the bearer or channel carrying the USD in the geographic region and receive the USD via the identified bearer or channel. In block 608 the processor may determine the service name(s), TMGI(s), and/or TSI(s) for services available in the current geographic region based at least in part on the received USD. In block 610 the processor may update the service list with the determined service name(s), TMGI(s), and/or TSI(s) available in the current geographic region and associate the service information with the current PLMN ID.

In an embodiment, a PLMN ID and the service information for the services available in the geographic region corresponding to that PLMN ID may already be listed in a service list because the receiver device may have traveled to that geographic region previously. Thus, when service information for the PLMN ID may already be available, the processor may not need to perform bootstrapping operations or receive a USD when reentering a previously visited geographic region. In response to determining the PLMN ID of the current geographic region is on the service list (i.e., determination block 604="Yes"), or upon updating the service list in block 610, the processor may select a national service for consumption in block 612. As an example, the user may indicate he or she desires to watch a national news service and the processor may select the FLUTE session associated with the name of that national news service.

In block 614 the processor may join the FLUTE session for the PLMN ID of the current geographic region associated with the name of the selected national service to receive the data stream of the national service in the current geographic region. In block 616 the receiver device may render the national service by outputting the received data stream of the FLUTE session for the PLMN ID of the current geographic region. As an example, the processor may render the news video by outputting video to a display and the news audio by outputting the audio to a speaker.

In determination block 618 the processor may determine whether a geographic region transition has occurred. For example, the processor may monitor overhead signaling to determine whether the receiver device has traveled from one geographic region to another geographic region. In response to determining a geographic region transition has not occurred (i.e., determination block 616="No"), the processor may continue to render the national service by outputting the received data stream of the FLUTE session for the PLMN ID of the current geographic region. In response to determining a geographic region transition has occurred (i.e., determination block 618="Yes"), the processor may determine the PLMN ID of the current geographic region in block 602, which may be a new PLMN ID different from the PLMN ID of the geographic region the receiver device transitioned from. In this manner, the processor may continually update the service list and/or join FLUTE sessions for the national service as it travels across geographic regions.

Figure 7:
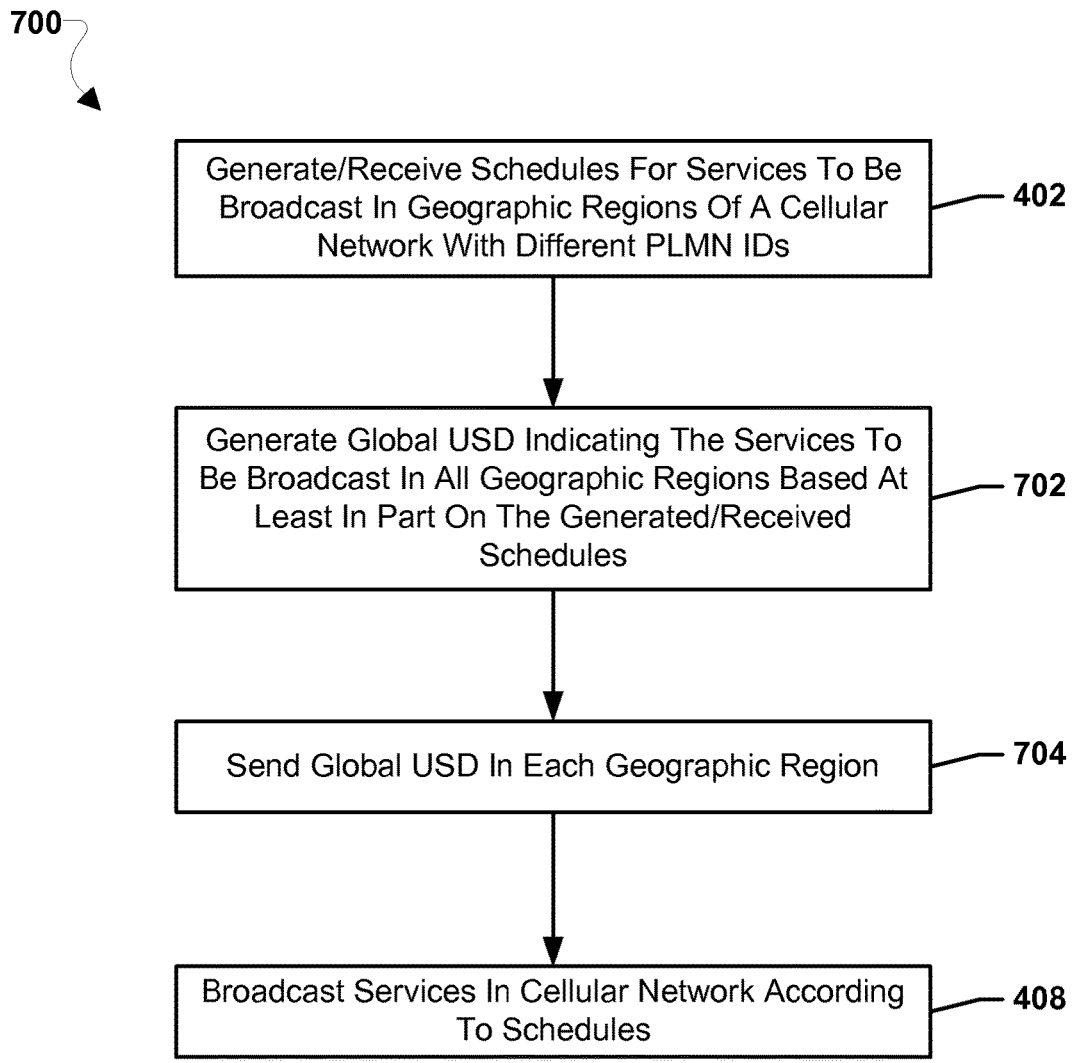
FIG. 7 is a process flow diagram illustrating an embodiment method for generating a global USD.

FIG. 7 illustrates an embodiment method 700 for generating a global USD for a network having geographic regions with different network identifiers, such as different PLMN IDs. In an embodiment, the operations of method 700 may be performed by a server of a network operator, such as an eMBMS network server (e.g., a provisioning interface server).

In block 402 the server may generate or receive schedules for services to be broadcast in geographic regions of a cellular network with different PLMN IDs. In an embodiment, the generated schedule may be a broadcast schedule used to control when services will be broadcast over a cellular network, such as an eMBMS network, for receipt by receiver devices. Services may be national services available in more than one geographic region of the cellular network or may be local services available in only one geographic region of the cellular network. In an embodiment, each local service may be assigned its own TMGI and its own TSI, while national services may be assigned different TMGI's in each geographic region but the same TSI across geographic regions.

In block 702 the server may generate a global USD indicating the services to be broadcast in all geographic regions based at least in part on the generated/received schedules. In an embodiment, the global USD may list every national service and every local service with its own service indication and associated SDP in each geographic region separately. In another embodiment, the global USD may list every national service with one network wide service indication and one associated SDP indicating all TMGIs for the national service and the national service's TSI together, while listing every local service with its own service indication and associated SDP in each geographic region separately. In a further embodiment, the global USD may list every national service with one network wide service indication and separate SDPs per geographic region listing that geographic region's TMGI, while listing every local service with its own service indication and associated SDP in each geographic region separately.

In block 704 the server may send a global USD for in each geographic region. As an example, the server may send the USD via a broadcast channel dedicated to scheduling information, such as a SA channel or bearer. As another example, the USD may be sent via a unicast channel directly to a receiver device.

In block 408 the server may broadcast the services in the cellular network according to the generated schedules as described above.

Figure 8A:
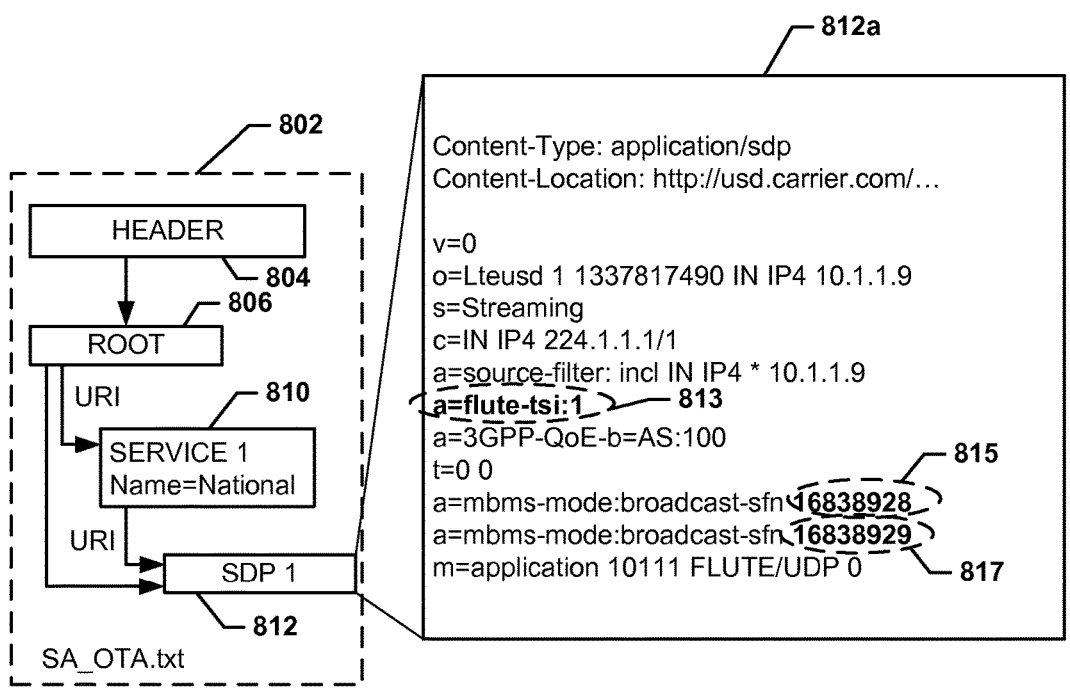
FIG. 8A is a data structure diagram of a global USD according to an embodiment.

FIG. 8A is a data structure diagram of a global USD 802 and according to an embodiment. For example, USD 802 may be SA file with the file name "SA_OTA.txt" and may be a multipart MIME file that concatenates all the files for the various services into one file. USD 802 may be the same file provided to receiver devices in all geographic regions of the network, and USD 802 may describe how the same national service named "National" may be broadcast in the different geographic regions. The USD 802 may include a header 804 (e.g., a multipart MIME header) and a root path 806 (e.g., a root file that may be a 3GPP metadata envelope such as a metadata fragment that provides the version information to the fragments identified via a URL. The USD 802 may indicate one or more services, such as Service 1 810 that may be the national service named "National", available in the more than one geographic regions of the network. The Service 1 810 may be associated with a SDP 1 812 that may indicate the common TSI assigned to the national service named "National" in all geographic regions of the network along with the different TMGIs used for the service in the different geographic regions. In an embodiment, the USD 802 may indicate the services and/or associated session descriptions by addresses (e.g., URLs) used to identify fragments that collectively may describe a service.

FIG. 8A further illustrates an example schema 812*a* associated with SDP 1 812. As illustrated in FIG. 8A, a single TSI 813 may be assigned to the national service named "National" in the all geographic regions of the network. Additionally, the different TMGIs 815 and 817 used in different geographic regions may be indicated in the same SDP. The TMGI for a geographic region may be selected based on the PLMN ID for that geographic region that comprised a portion of the TMGI.

Figure 8B:
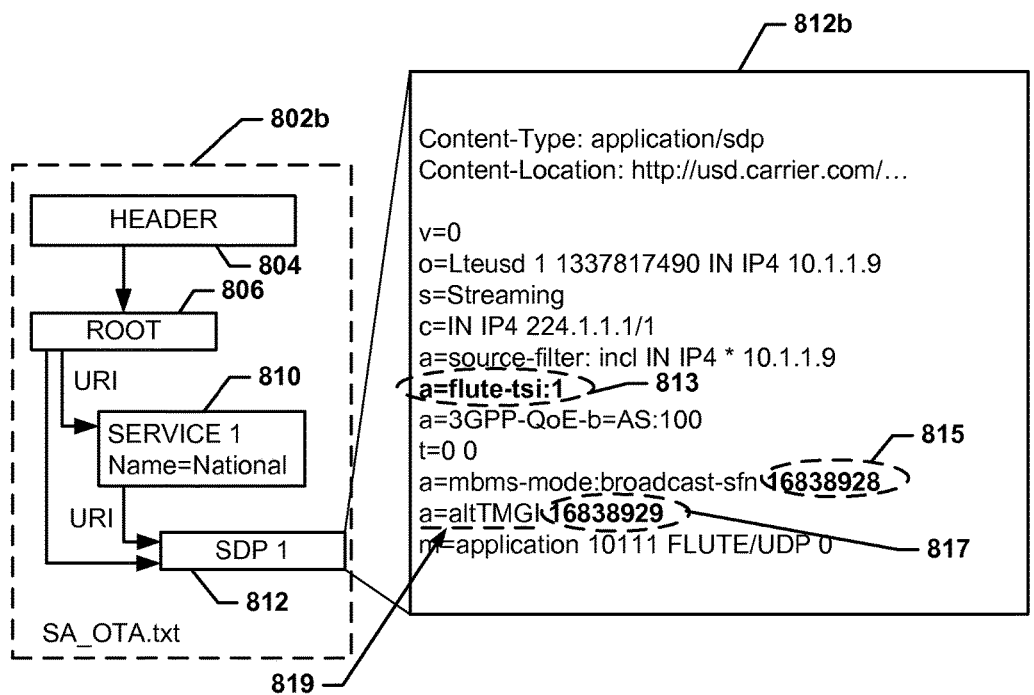
FIG. 8B is a data structure diagram of a global USD according to another embodiment.

FIG. 8B is a data structure of another global USD 802*b* according to an embodiment. USD 802*b* may be similar to the USD 802 described above, except that only one TMGI 815 may be indicated in an "mbms-mode" attribute in the SDP schema 812*b*. Any other TMGIs used in different geographic regions, such as TMGI 817, may be indicated in an alternate TMGI attribute 819 having an identifier other than "mbms-mode", for example "altTMGI." Embodiment devices configured to recognize multiple TMGI instances per SDP may be configured to recognize an attribute for alternative TMGIs assigned to a service, such as an "altTMGI" attribute. In this manner, the operation of a device configured to only recognized one TMGI instance per SDP (e.g., one instance of "mbms-mode" per SDP) may not be interrupted by providing alternative TMGI indications in the same SDP because an unrecognized attribute for the alternative TMGI's, such as "altTMGI," may be ignored by the device configured to only recognize one TMGI instance per SDP.

Figure 9:
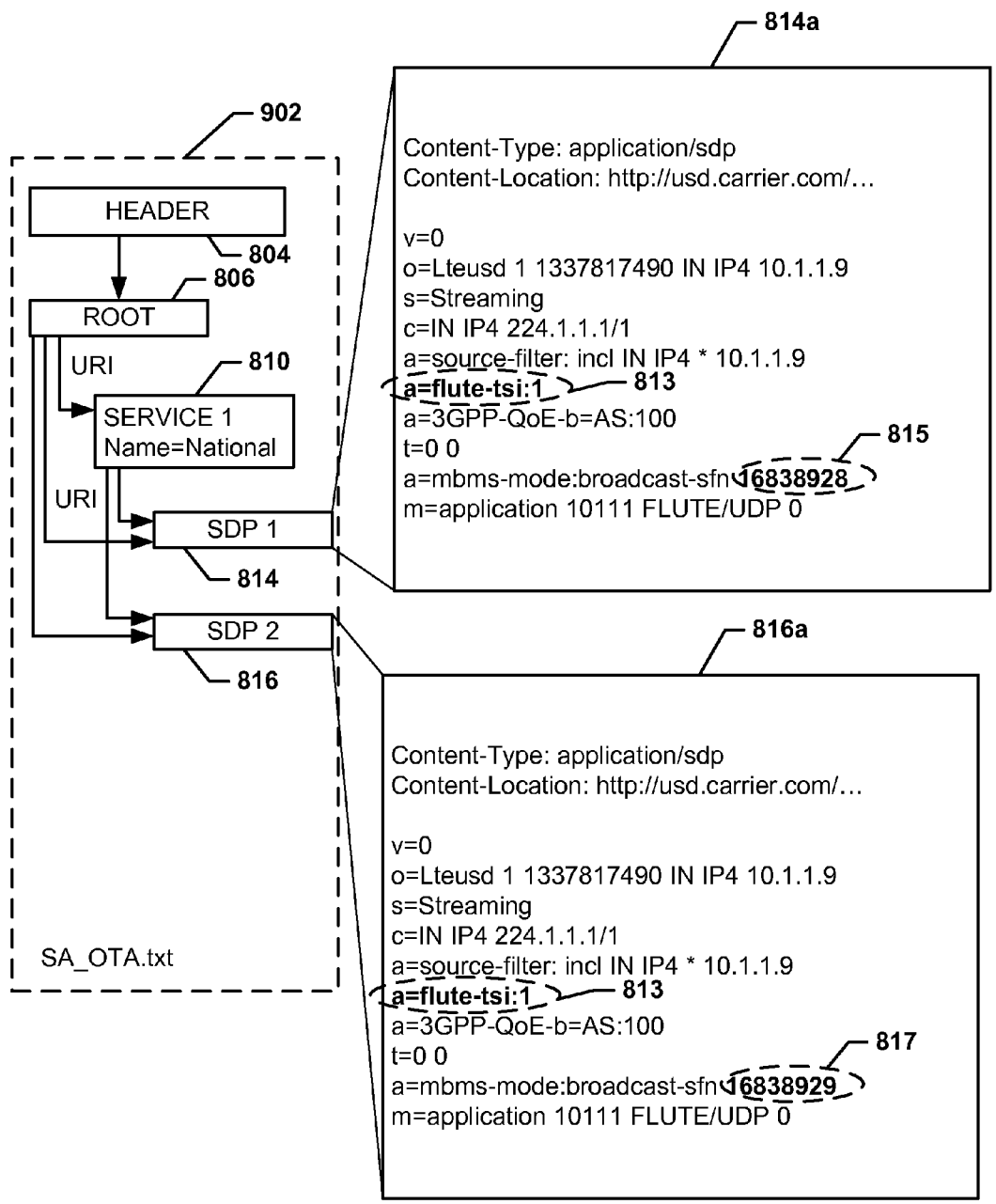
FIG. 9 is a data structure diagram of a global USD according to a third embodiment.

FIG. 9 is a data structure diagram of another global USD 902 according to an embodiment. USD 902 may be similar to USD 802 described above, except that USD 902 may include SDPs for each geographic region of the network for each national service. USD 902 may be the same file provided to receiver devices in all geographic regions of the network, and USD 902 may describe how the same national service named "National" may be broadcast in the different geographic regions. The USD 902 may include a header 804 and a root path 806. The USD 902 may indicate one or more services, such as Service 1 810 that may be the national service named "National", available in the more than one geographic regions of the network. The Service 1 810 may be associated with a SDP 1 814 associated with a first geographic region of the network and SDP 2 816 associated with a second geographic region of the network. A common TSI may indicated in each SDP 1 814 and SDP 2 816 with only the single TMGI used for Service 1 810 in the respective geographic region indicated in each SDP 1 814 and SDP 2 816.

Figure 10:
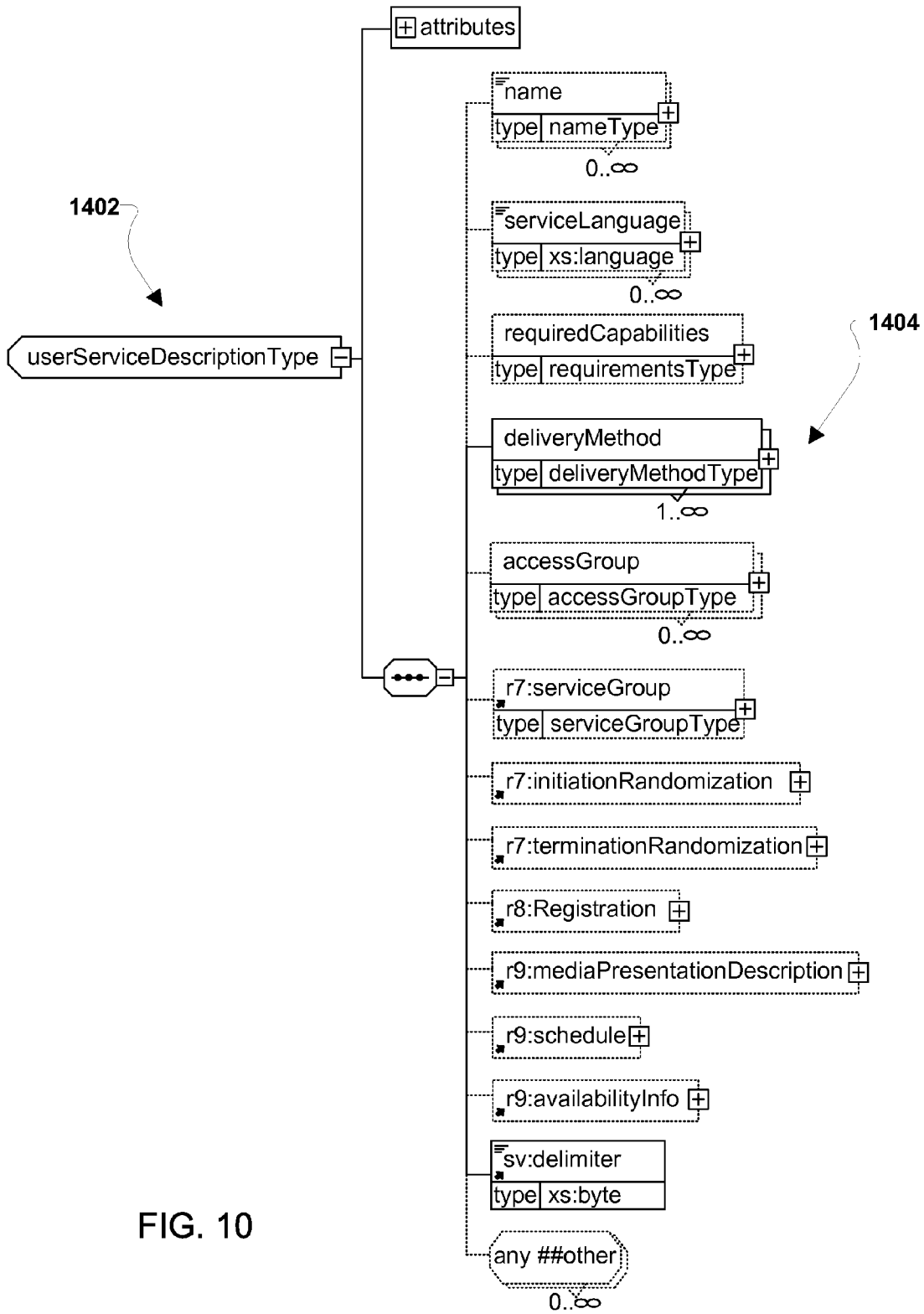
FIGS. 10 and 11 illustrate a global USD including one or more delivery method type attributes and one expanded delivery method type describing a single service according to an embodiment.
Figure 11:
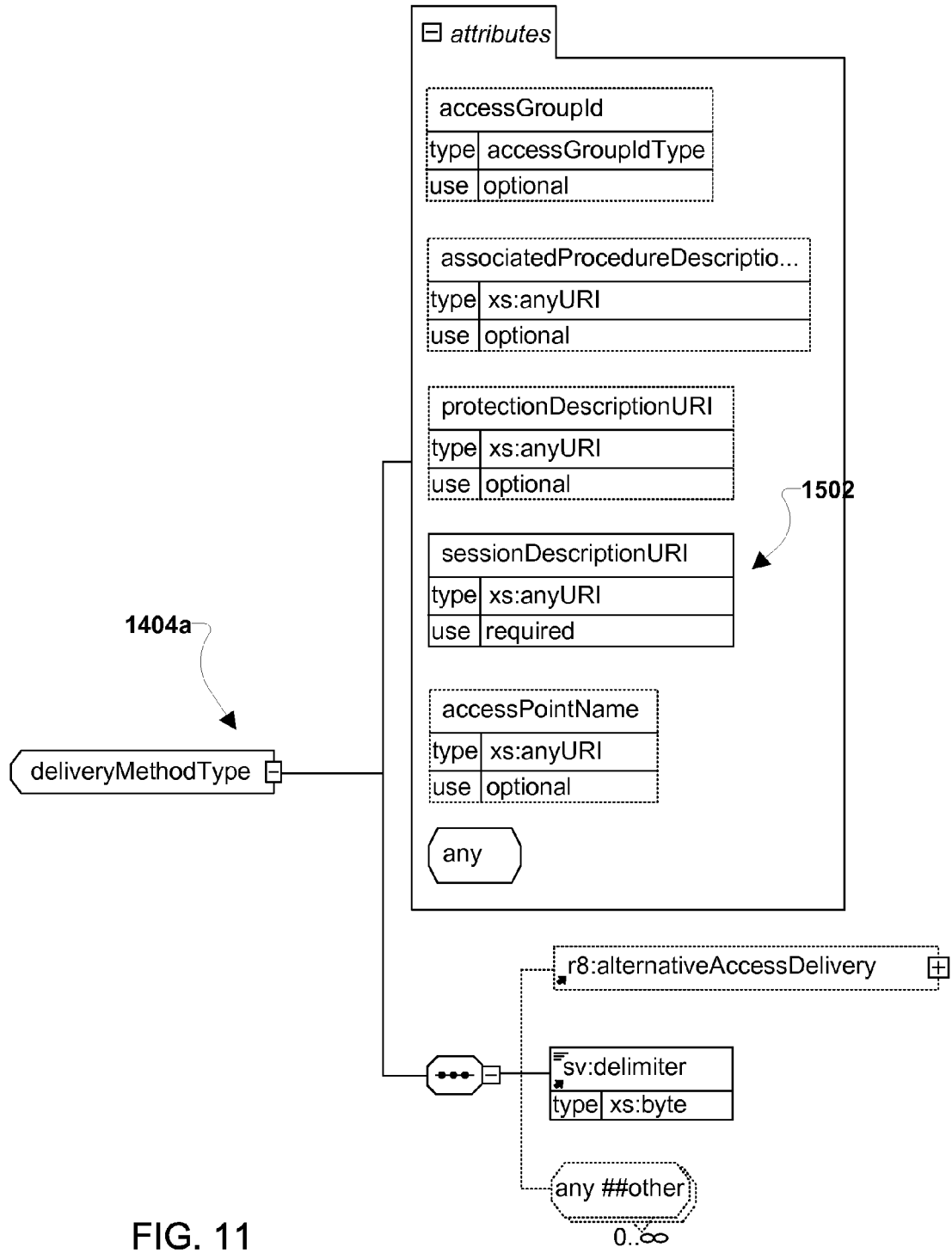

FIG. 9 further illustrates an example schema 814*a* associated with SDP 1 814 and an example schema 816*a* associated with SDP 2 816. As illustrated in FIG. 9, a single TSI 813 may be assigned to the national service named "National" in the all geographic regions of the network and indicated in both schema 814*a* and schema 816*a*. The TMGI 815 may be the only TMGI listed in schema 814*a* and the TMGI 817 may be the only TMGI listed in schema 816*a*. In an embodiment, a processor of the receiver device may determine that the different SDPs (e.g., SDP 1 814 and SDP 2 816) actually describe the same single FLUTE session used in all geographic regions. As an example, FIGS. 10 and 11 illustrate a global USD 1402 (FIG. 10) including one or more delivery method type attributes 1404 (FIG. 10) and one expanded delivery method type (1404*a*) describing the single service. As illustrated in FIGS. 10 and 11, the multiple occurrences of the delivery method 1404 (FIG. 10) (one of which, 1404*a*, is shown expanded in FIG. 11) may identify a specific SDP via the sessiondescriptionURI attribute 1502 (FIG. 11). Based on the global USD, a receiver device may determine that the different SDPs actually describe the same single FLUTE session used in all geographic regions.

Figure 12:
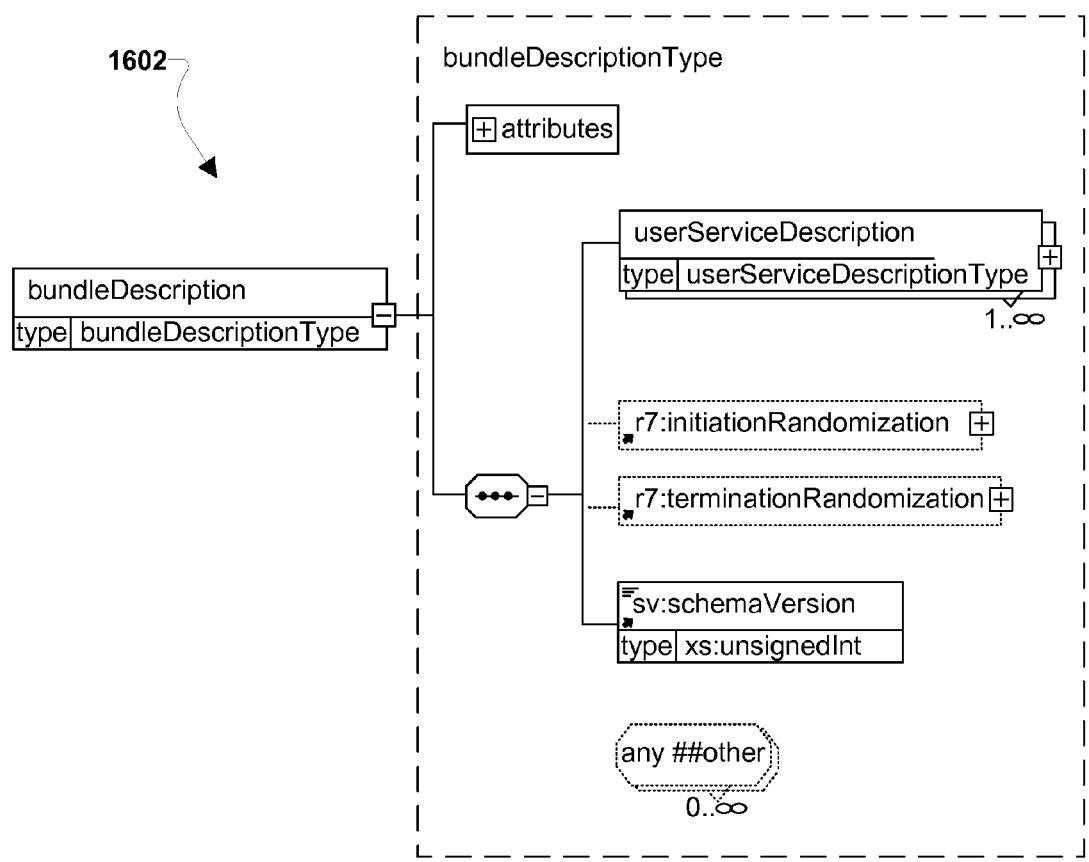
FIG. 12 is a process flow diagram illustrating another embodiment method for joining a FLUTE session to receive and render a national service available in two or more geographic regions of a network.

Service announcement documents may include various files enabling the receiver devices to receive services, such as USD Bundles (USDBs), USDBs fragments, SDP fragments, etc. For example, each BM-SC may generate a service announcement file indicating the national service definitions and the local service definitions for its geographic region, and send them to the receiver devices located in the area that the BM-SC serves. FIG. 12 illustrates an embodiment USDB 1602 that may be generated by a BM-SC and sent to the receiver devices located in the area that the BM-SC serves indicating the national service definitions and the local service definitions for its geographic region.

Figure 13:
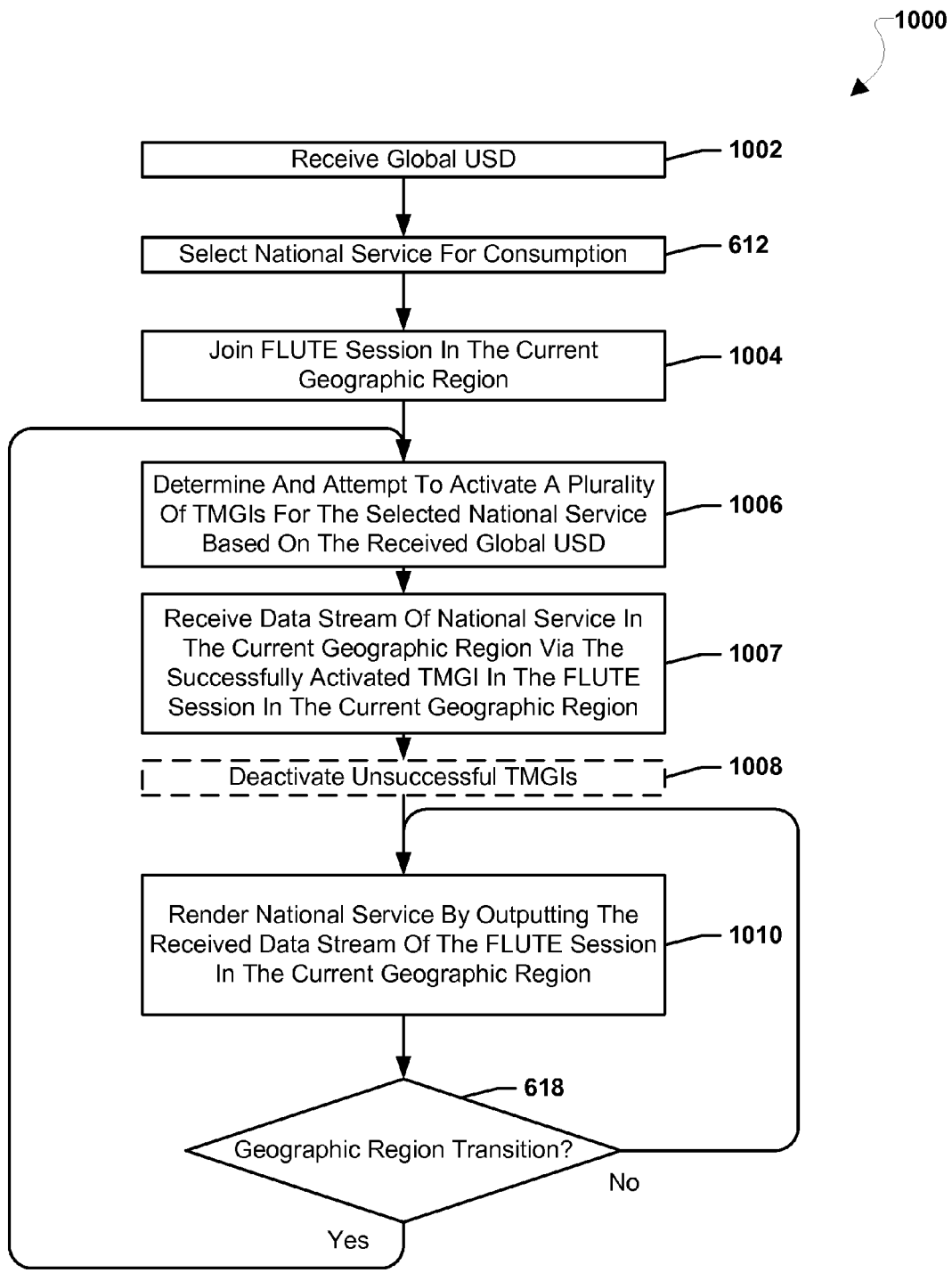
FIG. 13 is a process flow diagram illustrating a third embodiment method for joining a FLUTE session to receive and render a national service available in two or more geographic regions of a network.

FIG. 13 illustrates an embodiment method 1000 for joining a FLUTE session to receive and render a national service available in two or more geographic regions of a network. In an embodiment, the operations of method 1000 may be performed by a processor of a receiver device, for example by a MBMS or DASH client running on an application processor or a modem processor.

In block 1002 the processor may receive a global USD. A USD may be any type file, such as an SA file, schedule fragments, USD fragments, etc. In an embodiment, the processor may execute bootstrapping operations to identify the bearer or channel carrying the global USD in the geographic region and receive the global USD via the identified bearer or channel. As described above, in block 612 the processor may select a national service for consumption.

In block 1004 the processor may join the FLUTE session for the selected national service. For example, the processor may open the FLUTE session for the selected national service at least in part by opening a UDP port for receiving packets of the service. In an embodiment in which one SDP describes a single FLUTE session for the selected national service, the operations to join the FLUTE session may be done once and the FLUTE session may not need to be rejoined as geographic region transitions occur. In block 1006 the processor may determine and attempt to activate a plurality of TMGIs for the selected national service based on the received global USD. As examples, the processor may determine and attempt to activate more than one TMGI sequentially (effectively searching for a successful TMGI) or may attempt to activate all of the plurality of TMGIs at once. TMGIs may be considered different pipes within the FLUTE session, and in each geographic region only one TMGI may carry/provide packets. Thus, only one TMGI may be successful activated (e.g., actually provide packets to the receiver device). In block 1007 the processor may receive the data stream of the national service in the current geographic region via the successfully activated TMGI in the FLUTE session of the current geographic region. For example, while all TMGIs for the national service may be activated by the receiver device, activation may only be successful for the TMGI used in the current geographic region. In this manner, the FLUTE session for the national service in the current geographic region may be joined without the processor predetermining the TMGI corresponding to the PLMN ID of the current geographic network. In optional block 1008 the processor may deactivate the one or more unsuccessful TMGIs. Block 1008 may be optional because the TMGIs may be left activated. In this manner, as the receiver device moves across geographic regions, another TMGI may start providing packets of the service automatically in the new geographic region. In block 1010 the processor may render the national service by outputting the received data stream of the FLUTE session in the current geographic region.

As described above, in determination block 618 the processor may determine whether a geographic region transition has occurred. In response to determining a geographic region transition has not occurred (i.e., determination block 618="No"), the processor may continue to render the national service in block 1010 by outputting the received data stream of the FLUTE session in the current geographic region. In response to determining a geographic region transition has occurred (i.e., determination block 618="Yes"), the processor may determine and attempt to activate a plurality of TMGIs for the selected national service based on the received global USD in block 1004. A new USD may not be required to be downloaded nor may the single FLUTE session need to be re-joined upon transition to a new geographic region because the services in all geographic regions may be described in the previously received global USD and the FLUTE session may be the same for the selected national service. In this manner bootstrapping operations may be avoided.

Figure 14:
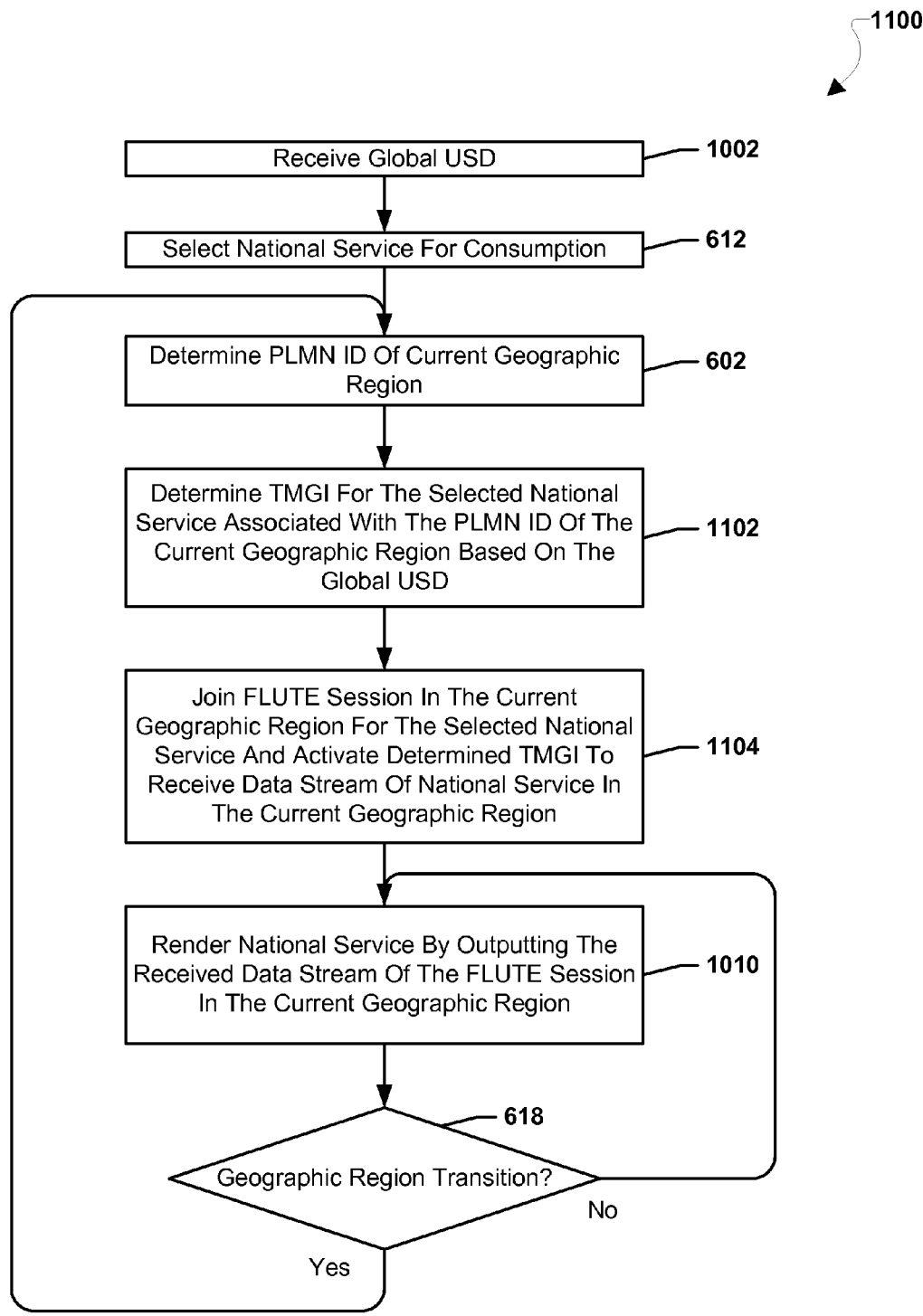
FIG. 14 illustrates an embodiment USDB that may be generated by a BM-SC and sent to the receiver devices located in the area that the BM-SC serves indicating the national service definitions and the local service definitions for its geographic region.

FIG. 14 illustrates an embodiment method 1100 for joining a FLUTE session to receive and render a national service available in two or more geographic regions of a network. In an embodiment, the operations of method 1100 may be performed by a processor of a receiver device, for example by a MBMS or DASH client running on an application processor or a modem processor.

As described above, in block 1002 the processor may receive a global USD, in block 612 the processor may select a national service for consumption, and in block 602 the processor may determine the PLMN ID of the current geographic region. In block 1102 the processor may determine the TMGI of the selected national service associated with the PLMN ID of the current geographic region based on the global USD. In block 1104 the processor may activate the determined TMGI and join the FLUTE session in the current geographic region for the selected national service in the current geographic region. As described above in block 1010 the processor may render the national service and in determination block 618 determine whether a geographic transition has occurred. In response to determining a geographic transition has occurred (i.e., determination block 618="Yes"), the processor may determine the PLMN ID of the new current geographic region in block 602, determine the new TMGI for the new current geographic region based on the global USD in block 1102, and activate the new TMGI for the new current geographic region to join the FLUTE session of the selected national service in the new current geographic region in block 1104. In this manner, as the geographic region of the receiver device changes the current TMGI may be selected based on the current geographic region's PLMN ID.

Figure 15:
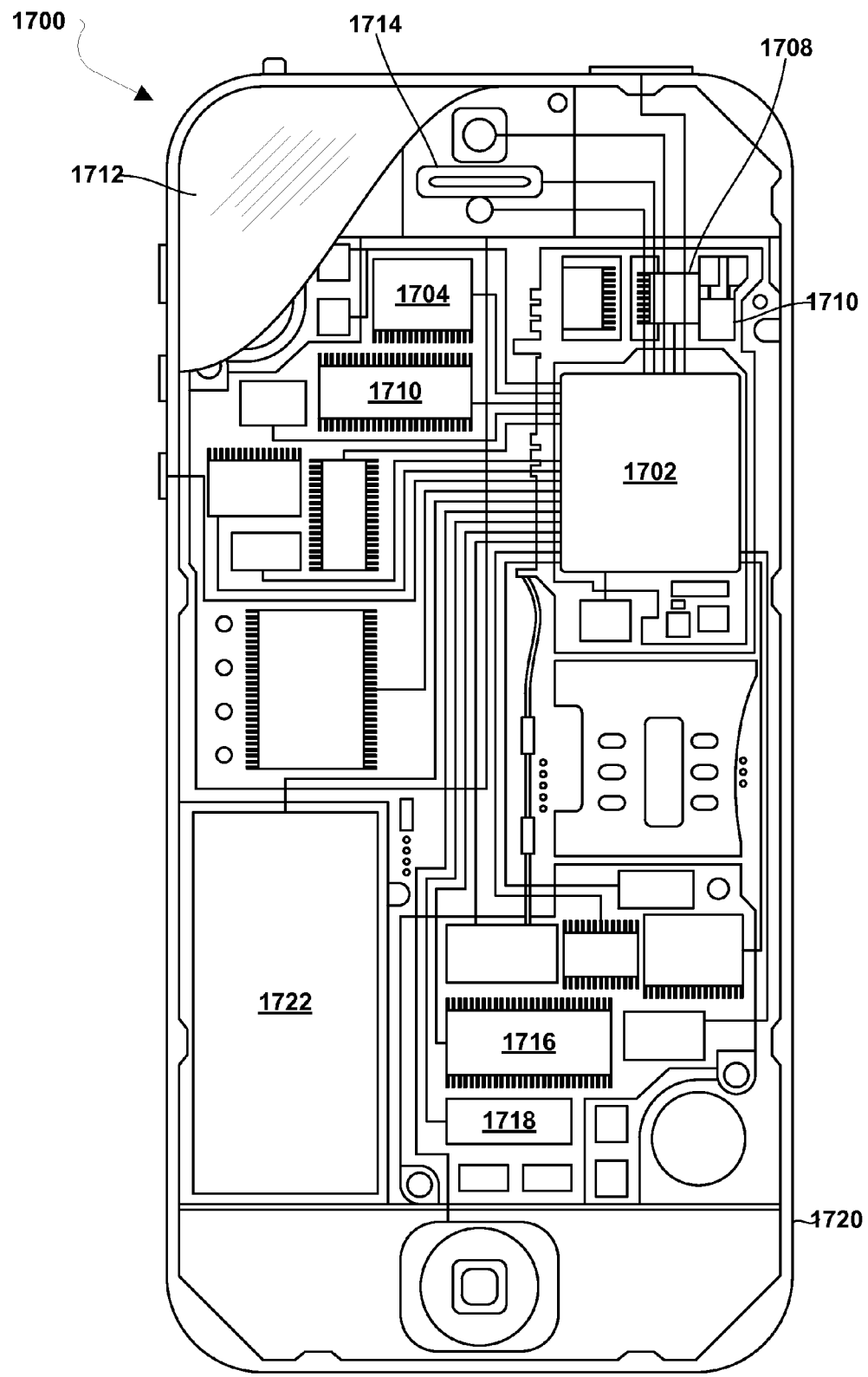
FIG. 15 is a component diagram of an example receiver device suitable for use with the various embodiments.

The various embodiments (including, but not limited to, some or all of the methods illustrated in FIGS. 6, 13 and 14) may be implemented in any of a variety of receiver devices, an example of which is illustrated in FIG. 15. For example, the receiver device 1700 may include a processor 1702 coupled to internal memories 1704 and 1706. Internal memories 1704 and 1706 may be volatile or non-volatile memories, and may also be secure and/or encrypted memories, or unsecure and/or unencrypted memories, or any combination thereof. The processor 1702 may also be coupled to a touch screen display 1712, such as a resistive-sensing touch screen, capacitive-sensing touch screen infrared sensing touch screen, or the like. Additionally, the display of the receiver device 1700 need not have touch screen capability. The receiver device 1700 may have one or more radio signal transceivers 1708 (e.g., Peanut®, Bluetooth®, Zigbee®, Wi-Fi, RF radio) and antennae 1710, for sending and receiving, coupled to each other and/or to the processor 1702. The receiver device 1700 may include a cellular network interface, such as wireless modem chip 1716, that enables communication via a cellular data network (e.g., CDMA, TDMA, GSM, PCS, 3G, 4G, LTE, or any other type of cellular data network) and is coupled to the processor 1702. The receiver device 1700 may include a peripheral device connection interface 1718 coupled to the processor 1702. The peripheral device connection interface 1718 may be singularly configured to accept one type of connection, or multiply configured to accept various types of physical and communication connections, common or proprietary, such as USB, FireWire, Thunderbolt, or PCIe. The peripheral device connection interface 1718 may also be coupled to a similarly configured peripheral device connection port. The receiver device 1700 may also include speakers 1714 for providing audio outputs. The receiver device 1700 may also include a housing 1720, constructed of a plastic, metal, or a combination of materials, for containing all or some of the components discussed herein. The receiver device 1700 may include a power source 1722 coupled to the processor 1702, such as a disposable or rechargeable battery. The rechargeable battery may also be coupled to the peripheral device connection port to receive a charging current from a source external to the receiver device 1700.

Figure 16:
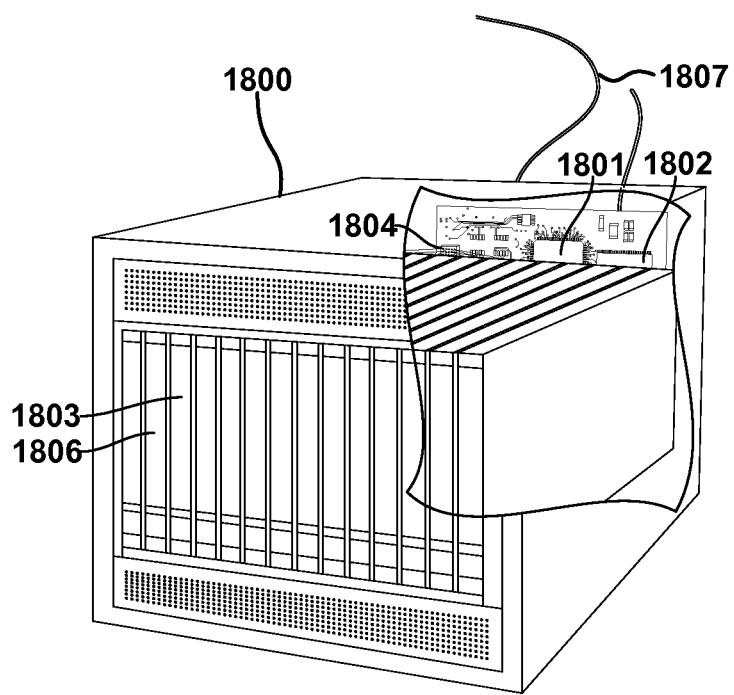
FIG. 16 is a component diagram of an example server suitable for use with the various embodiments.

The various embodiments (including, but not limited to, some or all of the methods illustrated in FIGS. 4 and 7) may also be implemented on any of a variety of commercially available server devices, such as the server 1800 illustrated in FIG. 16. Such a server 1800 typically includes a processor 1801 coupled to volatile memory 1802 and a large capacity nonvolatile memory, such as a disk drive 1803. The server 1800 may also include a floppy disc drive, compact disc (CD) or DVD disc drive 1806 coupled to the processor 1801. The server 1800 may also include one or more network transceivers 1804, such as a network access port, coupled to the processor 1801 for establishing network interface connections with a communication network 1807, such as a local area network coupled to other system computers and servers, the Internet, the public switched telephone network, and/or a cellular network (e.g., CDMA, TDMA, GSM, PCS, 3G, 4G, LTE, or any other type of cellular network).

The processors 1702 and 1801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1704, 1710, 1802, or 1803 before they are accessed and loaded into the processors 1702 and 1801. The processors 1702 and 1801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1702 and 1801 including internal memory or removable memory plugged into the device and memory within the processors 1702 and 1801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium (e.g., as processor-executable instructions stored on a non-transitory processor readable medium). The steps of a method or algorithm disclosed herein may be embodied in a processor-executable software module that may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions (e.g., stored processor-executable instructions) on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing a broadcast service in two different geographic regions of a network having different network identifiers, the method comprising:
   generating, at a server, a user service description ("USD") indicating at least two different temporary mobile group identifiers ("TMGIs") for a single File Delivery Over Unidirectional Transport ("FLUTE") session assigned to the broadcast service to be broadcast in each of the two different geographic regions, wherein the at least two different TMGIs are assigned to a same data stream of the broadcast service to be broadcast in each of the two different geographic regions; and
   sending, from the server, the USD to a receiver device in the network.

2. The method of claim 1, wherein the different network identifiers are different public land mobile network identifiers ("PLMN IDs").

3. The method of claim 2, wherein the USD indicates service information for all services available in the two different geographic regions.

4. The method of claim 3, wherein the service information for each service available in the two different geographic regions is described in a separate session description protocol ("SDP") for each service on a per geographic region basis.

5. The method of claim 3, wherein:
   transport session identifiers ("TSIs") and a source IP addresses assigned to the broadcast service are the same in each of the two different geographic regions; and
   the at least two different TMGIs assigned to the broadcast service are indicated in a single session description protocol ("SDP").

6. The method of claim 2, wherein transport session identifiers ("TSIs") and a source IP addresses assigned to the broadcast service are the same in each of the two different geographic regions.

7. The method of claim 6, wherein the at least two different TMGIs assigned to the broadcast service are indicated in a single session description protocol ("SDP").

8. The method of claim 6, wherein the at least two different TMGIs assigned to the broadcast service are indicated in different session description protocols ("SDPs") associated with a single instance of the broadcast service in the USD.

9. The method of claim 1, wherein the server is a provisioning interface server receiving service information from broadcast multicast service centers ("BM-SCs") associated with the two different geographic regions.

10. A method for providing a broadcast service in two different geographic regions of a network having different network identifiers, the method comprising:
generating, at a server, a first user service description ("USD") for a first of the two different geographic regions indicating a name, a first temporary mobile group identifier ("TMGI"), and a first transport session identifier ("TSI") assigned to the broadcast service to be broadcast in that first geographic region;
generating, at the server, a second USD for a second of the two different geographic regions indicating the name, a second TMGI, and a second TSI assigned to the broadcast service to be broadcast in that second geographic region;
sending, from the server, the first USD to a receiver device in the first geographic region; and
sending, from the server, the second USD to the receiver device in the second geographic region,
wherein both the first TMGI and the second TMGI are assigned to a same data stream of the broadcast service to be broadcast in both the first geographic region and the second geographic region.

11. The method of claim 10, wherein the different network identifiers are different public land mobile network identifiers ("PLMN IDs").

12. The method of claim 11, wherein the first USD and the second USD have different file names.

13. The method of claim 10, wherein the server is a provisioning interface server receiving service information from broadcast multicast service centers ("BM-SCs") associated with the two different geographic regions.

14. A method for providing a broadcast service in two different geographic regions of a network having different network identifiers, the method comprising:
generating, at a server, a first user service description ("USD") for a first of the two different geographic regions indicating a temporary mobile group identifier ("TMGI") and a transport session identifier ("TSI") assigned to the broadcast service to be broadcast in each of the two different geographic regions and service information for a first local service broadcast in only the first geographic region;
generating, at the server, a second USD for a second of the two different geographic regions indicating the TMGI and the TSI assigned to the broadcast service to be broadcast in each of the two different geographic regions and service information for a second local service broadcast in only the second geographic region, wherein the TMGI is assigned to a same data stream of the broadcast service to be broadcast in both the first geographic region and the second geographic region;
sending, from the server, the first USD to a receiver device in the first geographic region; and
sending, from the server, the second USD to the receiver device in the second geographic region.

15. The method of claim 14, wherein the different network identifiers are different public land mobile network identifiers ("PLMN IDs").

16. The method of claim 14, wherein the server is a provisioning interface server receiving service information from broadcast multicast service centers ("BM-SCs") associated with the two different geographic regions.

17. A method for providing a broadcast service in two different geographic regions of a network having different network identifiers, comprising:
receiving a user service description ("USD") at a receiver device, wherein the USD indicates at least two different temporary mobile group identifiers ("TMGIs") for a File Delivery Over Unidirectional Transport ("FLUTE") session assigned to the broadcast service to be broadcast in each of the two different geographic regions, wherein the at least two different TMGIs are assigned to a same data stream of the broadcast service to be broadcast in each of the two different geographic regions; and
joining the FLUTE session assigned to the service in one of the two different geographic regions to receive the data stream of the broadcast service at the receiver device.

18. The method of claim 17, wherein joining the FLUTE session assigned to the broadcast service in one of the two different geographic regions to receive the data stream of the broadcast service at the receiver device comprises:
determining, at the receiver device, a public land mobile network identifier ("PLMN ID") of a current geographic region of the two different geographic regions the receiver device is located in;
determining, at the receiver device, a TMGI of the at least two different TMGIs corresponding to the PLMN ID of the current geographic region based on the received USD;
joining the FLUTE session of the broadcast service in the current geographic region at the receiver device; and
activating the determined TMGI to receive the data stream of the broadcast service at the receiver device via the FLUTE session of the broadcast service in the current geographic region.

19. The method of claim 17, wherein joining the FLUTE session assigned to the broadcast service in one of the two different geographic regions to receive the data stream of the broadcast service at the receiver device comprises:
determining, at the receiver device, a plurality of TMGIs assigned to the broadcast service;
joining the FLUTE session of the broadcast service at the receiver device;
attempting to activate the plurality of determined TMGIs at the receiver device; and
receiving the data stream of the broadcast service at the receiver device via a successfully activated TMGI in the FLUTE session of the broadcast service.

20. The method of claim 19, wherein attempting to activate the plurality of determined TMGIs at the receiver device comprises sequentially activating one of the plurality of determined TMGIs at the receiver device until activation of one of the plurality of determined TMGIs is successful.

21. The method of claim 19, wherein attempting to activate the plurality of determined TMGIs at the receiver device comprises opening all of the TMGIs at once at the receiver device.

22. A server, comprising:
a network transmitter; and
a processor connected to the network transmitter and configured with processor-executable instructions to perform operations comprising:
generating a user service description ("USD") indicating at least two different temporary mobile group identifiers ("TMGIs") for a single File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions and wherein the two different geographic regions have different network identifiers; and
sending the USD to a receiver device in the network via the network transmitter.

23. The server of claim 22, wherein the processor is configured with processor-executable instructions to perform operations such that the different network identifiers are different public land mobile network identifiers ("PLMN IDs").

24. The server of claim 23, wherein the processor is configured with processor-executable instructions to perform operations such that the USD indicates service information for all services available in the two different geographic regions.

25. The server of claim 24, wherein the processor is configured with processor-executable instructions to perform operations such that the service information for each service available in the two different geographic regions is described in a separate session description protocol ("SDP") for each service on a per geographic region basis.

26. The server of claim 24, wherein the processor is configured with processor-executable instructions to perform operations such that:
transport session identifiers ("TSIs") and a source IP addresses assigned to the broadcast service are the same in each of the two different geographic regions; and
the at least two different TMGIs assigned to the broadcast service are indicated in a single session description protocol ("SDP").

27. The server of claim 23, wherein the processor is configured with processor-executable instructions to perform operations such that transport session identifiers ("TSIs") and a source IP addresses assigned to the broadcast service are the same in each of the two different geographic regions.

28. The server of claim 27, wherein the processor is configured with processor-executable instructions to perform operations such that the at least two different TMGIs assigned to the broadcast service are indicated in a single session description protocol ("SDP").

29. The server of claim 27, wherein the processor is configured with processor-executable instructions to perform operations such that the at least two different TMGIs assigned to the broadcast service are indicated in different session description protocols ("SDPs") associated with a single instance of the broadcast service in the USD.

30. The server of claim 22, wherein the server is a provisioning interface server receiving service information from broadcast multicast service centers ("BM-SCs") associated with the two different geographic regions.

31. A server, comprising:
a network transmitter; and
a processor connected to the network transmitter and configured with processor-executable instructions to perform operations comprising:
generating a first user service description ("USD") for a first of two different geographic regions of a network indicating a name, a first temporary mobile group identifier ("TMGI"), and a first transport session identifier ("TSI") assigned to a broadcast service to be broadcast in that first geographic region, wherein the two different geographic regions have different network identifiers;
generating a second USD for a second of the two different geographic regions indicating the name, a second TMGI, and a second TSI assigned to the broadcast service to be broadcast in that second geographic region;
sending the first USD to a receiver device in the first geographic region via the network transmitter; and
sending the second USD to the receiver device in the second geographic region via the network transmitter,
wherein the processor is configured with processor-executable instructions to perform operations such that both the first TMGI and the second TMGI are assigned to a same data stream of the broadcast service to be broadcast in both the first geographic region and the second geographic region.

32. The server of claim 31, wherein the processor is configured with processor-executable instructions to perform operations such that the different network identifiers are different public land mobile network identifiers ("PLMN IDs").

33. The server of claim 32, wherein the processor is configured with processor-executable instructions to perform operations such that the first USD and the second USD have different file names.

34. The server of claim 31, wherein the server is a provisioning interface server receiving service information from broadcast multicast service centers ("BM-SCs") associated with the two different geographic regions.

35. A server comprising:
a network transmitter; and
a processor connected to the network transmitter and configured with processor-executable instructions to perform operations comprising:
generating a first user service description ("USD") for a first of two different geographic regions of a network indicating a temporary mobile group identifier ("TMGI") and a transport session identifier ("TSI") assigned to a broadcast service to be broadcast in each of the two different geographic regions and service information for a first local service broadcast in only the first geographic region, wherein the two different geographic regions have different network identifiers;
generating a second USD for a second of the two different geographic regions indicating the TMGI and the TSI assigned to the broadcast service to be broadcast in each of the two different geographic regions and service information for a second local service broadcast in only the second geographic region, wherein the TMGI is assigned to a same data stream of the broadcast service to be broadcast in both the first geographic region and the second geographic region;

sending the first USD to a receiver device in the first geographic region via the network transmitter; and sending the second USD to the receiver device in the second geographic region via the network transmitter.

36. The server of claim 35, wherein the processor is configured with processor-executable instructions to perform operations such that the different network identifiers are different public land mobile network identifiers ("PLMN IDs").

37. The server of claim 35, wherein the server is a provisioning interface server receiving service information from broadcast multicast service centers ("BM-SCs") associated with the two different geographic regions.

38. A receiver device, comprising:
a wireless network interface; and
a processor connected to the wireless network interface and configured with processor-executable instructions to perform operations comprising:
receiving a user service description ("USD") via the wireless network interface, wherein the USD indicates at least two different temporary mobile group identifiers ("TMGIs") for a File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions, and wherein the two different geographic regions have different network identifiers; and
joining the FLUTE session assigned to the service in one of the two different geographic regions to receive the data stream of the broadcast service via the wireless network interface.

39. The receiver device of claim 38, wherein the processor is configured with processor-executable instructions to perform operations such that joining the FLUTE session assigned to the broadcast service in one of the two different geographic regions to receive the data stream of the broadcast service via the wireless network interface comprises:
determining a public land mobile network identifier ("PLMN ID") of a current geographic region of the two different geographic regions the receiver device is located in;
determining a TMGI of the at least two different TMGIs corresponding to the PLMN ID of the current geographic region based on the received USD;
joining the FLUTE session of the broadcast service in the current geographic region; and activating the determined TMGI to receive the data stream of the broadcast service via the FLUTE session of the broadcast service in the current geographic region via the wireless network interface.

40. The receiver device of claim 38, wherein the processor is configured with processor-executable instructions to perform operations such that joining the FLUTE session assigned to the broadcast service in one of the two different geographic regions to receive the data stream of the broadcast service via the wireless network interface comprises:
determining a plurality of TMGIs assigned to the broadcast service;
joining the FLUTE session of the broadcast service;

attempting to activate the plurality of determined TMGIs; and receiving the data stream of the broadcast service via a successfully activated TMGI in the FLUTE session of the broadcast service via the wireless network interface.

41. The receiver device of claim 40, wherein the processor is configured with processor-executable instructions to perform operations such that attempting to activate the plurality of determined TMGIs comprises sequentially activating one of the plurality of determined TMGIs until activation of one of the plurality of determined TMGIs is successful.

42. The receiver device of claim 40, wherein the processor is configured with processor-executable instructions to perform operations such that attempting to activate the plurality of determined TMGIs comprises opening all of the TMGIs at once.

43. A non-transitory processor-readable storage medium having stored thereon processor-executable instructions configured to cause a processor of a server to perform operations comprising:
generating a user service description ("USD") indicating at least two different temporary mobile group identifiers ("TMGIs") for a single File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions and wherein the two different geographic regions have different network identifiers; and
sending the USD to a receiver device in the network.

44. The non-transitory processor-readable storage medium of claim 43, wherein the stored processor-executable instructions are configured to cause a processor of a server to perform operations such that the different network identifiers are different public land mobile network identifiers ("PLMN IDs").

45. The non-transitory processor-readable storage medium of claim 44, wherein the stored processor-executable instructions are configured to cause a processor of a server to perform operations such that the USD indicates service information for all services available in the two different geographic regions.

46. The non-transitory processor-readable storage medium of claim 45, wherein the stored processor-executable instructions are configured to cause a processor of a server to perform operations such that the service information for each service available in the two different geographic regions is described in a separate session description protocol ("SDP") for each service on a per geographic region basis.

47. The non-transitory processor-readable storage medium of claim 45, wherein the stored processor-executable instructions are configured to cause a processor of a server to perform operations such that:
transport session identifiers ("TSIs") and a source IP addresses assigned to the broadcast service are the same in each of the two different geographic regions; and
the at least two different TMGIs assigned to the broadcast service are indicated in a single session description protocol ("SDP").

48. The non-transitory processor-readable storage medium of claim 44, wherein the stored processor-executable instructions are configured to cause a processor of a server to perform operations such that transport session identifiers ("TSIs") and a source IP addresses assigned to the broadcast service are the same in each of the two different geographic regions.

49. The non-transitory processor-readable storage medium of claim 48, wherein the stored processor-executable instructions are configured to cause a processor of a server to perform operations such that the at least two different TMGIs assigned to the broadcast service are indicated in a single session description protocol ("SDP").

50. The non-transitory processor-readable storage medium of claim 48, wherein the stored processor-executable instructions are configured to cause a processor of a server to perform operations such that the at least two different TMGIs assigned to the broadcast service are indicated in different session description protocols ("SDPs") associated with a single instance of the broadcast service in the USD.

51. The non-transitory processor-readable storage medium of claim 43, wherein the stored processor-executable instructions are configured to cause a processor of a server to perform operations such that the processor is a processor of a provisioning interface server receiving service information from broadcast multicast service centers ("BM-SCs") associated with the two different geographic regions.

52. A non-transitory processor-readable storage medium having stored thereon processor-executable instructions configured to cause a processor of a server to perform operations comprising:
   generating a first user service description ("USD") for a first of two different geographic regions of a network indicating a name, a first temporary mobile group identifier ("TMGI"), and a first transport session identifier ("TSI") assigned to a broadcast service to be broadcast in that first geographic region, wherein the two different geographic regions have different network identifiers;
   generating a second USD for a second of the two different geographic regions indicating the name, a second TMGI, and a second TSI assigned to the broadcast service to be broadcast in that second geographic region;
   sending the first USD to a receiver device in the first geographic region; and
   sending the second USD to the receiver device in the second geographic region,
   wherein the stored processor-executable instructions are configured to cause a processor of a server to perform operations such that both the first TMGI and the second TMGI are assigned to a same data stream of the broadcast service to be broadcast in both the first geographic region and the second geographic region.

53. The non-transitory processor-readable storage medium of claim 52, wherein the stored processor-executable instructions are configured to cause a processor of a server to perform operations such that the different network identifiers are different public land mobile network identifiers ("PLMN IDs").

54. The non-transitory processor-readable storage medium of claim 53, wherein the stored processor-executable instructions are configured to cause a processor of a server to perform operations such that the first USD and the second USD have different file names.

55. The non-transitory processor-readable storage medium of claim 52, wherein the stored processor-executable instructions are configured to cause a processor of a server to perform operations such that the processor is a processor of a provisioning interface server receiving service information from broadcast multicast service centers ("BM-SCs") associated with the two different geographic regions.

56. A non-transitory processor-readable storage medium having stored thereon processor-executable instructions configured to cause a processor of a server to perform operations comprising:
   generating a first user service description ("USD") for a first of two different geographic regions of a network indicating a temporary mobile group identifier ("TMGI") and a transport session identifier ("TSI") assigned to a broadcast service to be broadcast in each of the two different geographic regions and service information for a first local service broadcast in only the first geographic region, wherein the two different geographic regions have different network identifiers;
   generating a second USD for a second of the two different geographic regions indicating the TMGI and the TSI assigned to the broadcast service to be broadcast in each of the two different geographic regions and service information for a second local service broadcast in only the second geographic region, wherein the TMGI is assigned to a same data stream of the broadcast service to be broadcast in both the first geographic region and the second geographic region;
   sending the first USD to a receiver device in the first geographic region; and
   sending the second USD to the receiver device in the second geographic region.

57. The non-transitory processor-readable storage medium of claim 56, wherein the stored processor-executable instructions are configured to cause a processor of a server to perform operations such that the different network identifiers are different public land mobile network identifiers ("PLMN IDs").

58. The non-transitory processor-readable storage medium of claim 56, wherein the stored processor-executable instructions are configured to cause a processor of a server to perform operations such that the processor is a processor of a provisioning interface server receiving service information from broadcast multicast service centers ("BM-SCs") associated with the two different geographic regions.

59. A non-transitory processor-readable storage medium having stored thereon processor-executable instructions configured to cause a processor of a receiver device to perform operations comprising:
   receiving a user service description ("USD"), wherein the USD indicates at least two different temporary mobile group identifiers ("TMGIs") for a File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions, and wherein the two different geographic regions have different network identifiers; and
   joining the FLUTE session assigned to the service in one of the two different geographic regions to receive the data stream of the broadcast service.

60. The non-transitory processor-readable storage medium of claim 59, wherein the stored processor-executable instructions are configured to cause a processor of a receiver device to perform operations such that joining the FLUTE session assigned to the broadcast service in one of the two different geographic regions to receive the data stream of the broadcast service comprises:
- determining a public land mobile network identifier ("PLMN ID") of a current geographic region of the two different geographic regions the receiver device is located in;
- determining a TMGI of the at least two different TMGIs corresponding to the PLMN ID of the current geographic region based on the received USD;
- joining the FLUTE session of the broadcast service in the current geographic region; and
- activating the determined TMGI to receive the data stream of the broadcast service via the FLUTE session of the broadcast service in the current geographic region.

61. The non-transitory processor-readable storage medium of claim 59, wherein the stored processor-executable instructions are configured to cause a processor of a receiver device to perform operations such that joining the FLUTE session assigned to the broadcast service in one of the two different geographic regions to receive the data stream of the broadcast service comprises:
- determining a plurality of TMGIs assigned to the broadcast service;
- joining the FLUTE session of the broadcast service;
- attempting to activate the plurality of determined TMGIs; and
- receiving the data stream of the broadcast service via a successfully activated TMGI in the FLUTE session of the broadcast service.

62. The non-transitory processor-readable storage medium of claim 61, wherein the stored processor-executable instructions are configured to cause a processor of a receiver device to perform operations such that attempting to activate the plurality of determined TMGIs comprises sequentially activating one of the plurality of determined TMGIs until activation of one of the plurality of determined TMGIs is successful.

63. The non-transitory processor-readable storage medium of claim 61, wherein the stored processor-executable instructions are configured to cause a processor of a receiver device to perform operations such that attempting to activate the plurality of determined TMGIs comprises opening all of the TMGIs at once.

64. A server, comprising:
- means for generating a user service description ("USD") indicating at least two different temporary mobile group identifiers ("TMGIs") for a single File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions and wherein the two different geographic regions have different network identifiers; and means for sending the USD to a receiver device in the network.

65. A server, comprising:
- means for generating a first user service description ("USD") for a first of two different geographic regions of a network indicating a name, a first temporary mobile group identifier ("TMGI"), and a first transport session identifier ("TSI") assigned to a broadcast service to be broadcast in that first geographic region, wherein the two different geographic regions have different network identifiers;
- means for generating a second USD for a second of the two different geographic regions indicating the name, a second TMGI, and a second TSI assigned to the broadcast service to be broadcast in that second geographic region;
- means for sending the first USD to a receiver device in the first geographic region; and
- means for sending the second USD to the receiver device in the second geographic region,
- wherein both the first TMGI and the second TMGI are assigned to a same data stream of the broadcast service to be broadcast in both the first geographic region and the second geographic region.

66. A server comprising:
- means for generating a first user service description ("USD") for a first of two different geographic regions of a network indicating a temporary mobile group identifier ("TMGI") and a transport session identifier ("TSI") assigned to a broadcast service to be broadcast in each of the two different geographic regions and service information for a first local service broadcast in only the first geographic region, wherein the two different geographic regions have different network identifiers;
- means for generating a second USD for a second of the two different geographic regions indicating the TMGI and the TSI assigned to the broadcast service to be broadcast in each of the two different geographic regions and service information for a second local service broadcast in only the second geographic region, wherein the TMGI is assigned to a same data stream of the broadcast service to be broadcast in both the first geographic region and the second geographic region;
- means for sending the first USD to a receiver device in the first geographic region; and
- means for sending the second USD to the receiver device in the second geographic region.

67. A receiver device, comprising:
- means for receiving a user service description ("USD"), wherein the USD indicates at least two different temporary mobile group identifiers ("TMGIs") for a File Delivery Over Unidirectional Transport ("FLUTE") session assigned to a broadcast service to be broadcast in each of two different geographic regions of a network, wherein the at least two different TMGIs are assigned to a same data stream of the broadcast service to be broadcast in each of the two different geographic regions, and wherein the two different geographic regions have different network identifiers; and
- means for joining the FLUTE session assigned to the service in one of the two different geographic regions to receive the data stream of the broadcast service.

* * * * *